(12) United States Patent
Greene et al.

(10) Patent No.: US 11,869,510 B1
(45) Date of Patent: Jan. 9, 2024

(54) AUTHENTICATION OF INTENDED SPEECH AS PART OF AN ENROLLMENT PROCESS

(71) Applicant: Amazon Technologies, Inc., Seattle, WA (US)

(72) Inventors: Joseph James Greene, Shoreline, WA (US); Xiejia Zhang, Kirkland, WA (US); Constantinos Papayiannis, Waltham, MA (US); Siddhi Pathak, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 17/191,538

(22) Filed: Mar. 3, 2021

(51) Int. Cl.
  *G10L 17/04*      (2013.01)
  *G10L 25/18*      (2013.01)
  *G10L 17/02*      (2013.01)
  *G06N 20/00*      (2019.01)
  *G10L 17/24*      (2013.01)
  *G06N 7/01*       (2023.01)

(52) U.S. Cl.
  CPC ............... *G10L 17/04* (2013.01); *G06N 7/01* (2023.01); *G06N 20/00* (2019.01); *G10L 17/02* (2013.01); *G10L 17/24* (2013.01); *G10L 25/18* (2013.01)

(58) Field of Classification Search
  CPC ......... G10L 17/02; G10L 17/04; G10L 17/24; G10L 25/18; G06N 20/00; G06N 7/005
  See application file for complete search history.

(56) References Cited

U.S. PATENT DOCUMENTS

| | | | |
|---|---|---|---|
| 2005/0288930 A1* | 12/2005 | Shaw .................. | G10L 15/26 704/E15.045 |
| 2006/0149558 A1* | 7/2006 | Kahn .................. | G10L 15/063 704/278 |
| 2009/0241201 A1* | 9/2009 | Wootton ............. | G06F 21/31 726/28 |
| 2015/0301796 A1* | 10/2015 | Visser ................. | G10L 17/22 715/728 |
| 2018/0261213 A1* | 9/2018 | Arik .................... | G06N 3/0445 |
| 2019/0243956 A1* | 8/2019 | Sheets ................ | H04W 12/065 |
| 2021/0233525 A1* | 7/2021 | Jaiswal .............. | G10L 15/22 |
| 2021/0264948 A1* | 8/2021 | Mizutani ............ | G11B 27/10 |
| 2021/0272584 A1* | 9/2021 | McAlpine ......... | A63F 13/215 |
| 2022/0130415 A1* | 4/2022 | Garrison ............ | G10L 25/51 |
| 2022/0343895 A1* | 10/2022 | Tomar ................ | G10L 15/16 |

* cited by examiner

*Primary Examiner* — Daniel C Washburn
*Assistant Examiner* — Paul J. Mueller
(74) *Attorney, Agent, or Firm* — Athorus, PLLC

(57) ABSTRACT

Described are systems, methods, and apparatus that detect keywords in one or more speech segments to authenticate that the speech is generated by the speaker as part of an intentional enrollment by the speaker into a service. For example, as a speech segment is received as part of an enrollment process, the speech segment may be converted into a log melspectrogram and the log melspectrogram may be processed using a machine learning model to determine if an expected keyword is represented by the log melspectrogram. If the keyword is detected, it may be determined that the speech output by the speaker is output as part of an intentional enrollment process.

20 Claims, 15 Drawing Sheets

AUTHENTICATION OF INTENDED SPEECH AS PART OF AN ENROLLMENT PROCESS

BACKGROUND

Devices, from wearable devices to counter-top devices, that are operable detect human speech, movement, and/or other activities are increasing in popularity. Many of these devices are associated with one or more services, allowing voice-based interaction between the service and a user, via the device. For example, some devices may be verbally interacted with by a user to control other appliances (e.g., turn on/off lights, lock doors, start automobiles, etc.), to order items, play music, etc. In some instances, a user must subscribe to or join a service and the service may identify the user based on a voice profile generated for the user as part of an enrollment process. However, existing systems may present security risks in voice enrollment of a user into a service.

BRIEF DESCRIPTION OF DRAWINGS

The detailed description is described with reference to the accompanying figures.

DETAILED DESCRIPTION

Figure 1:
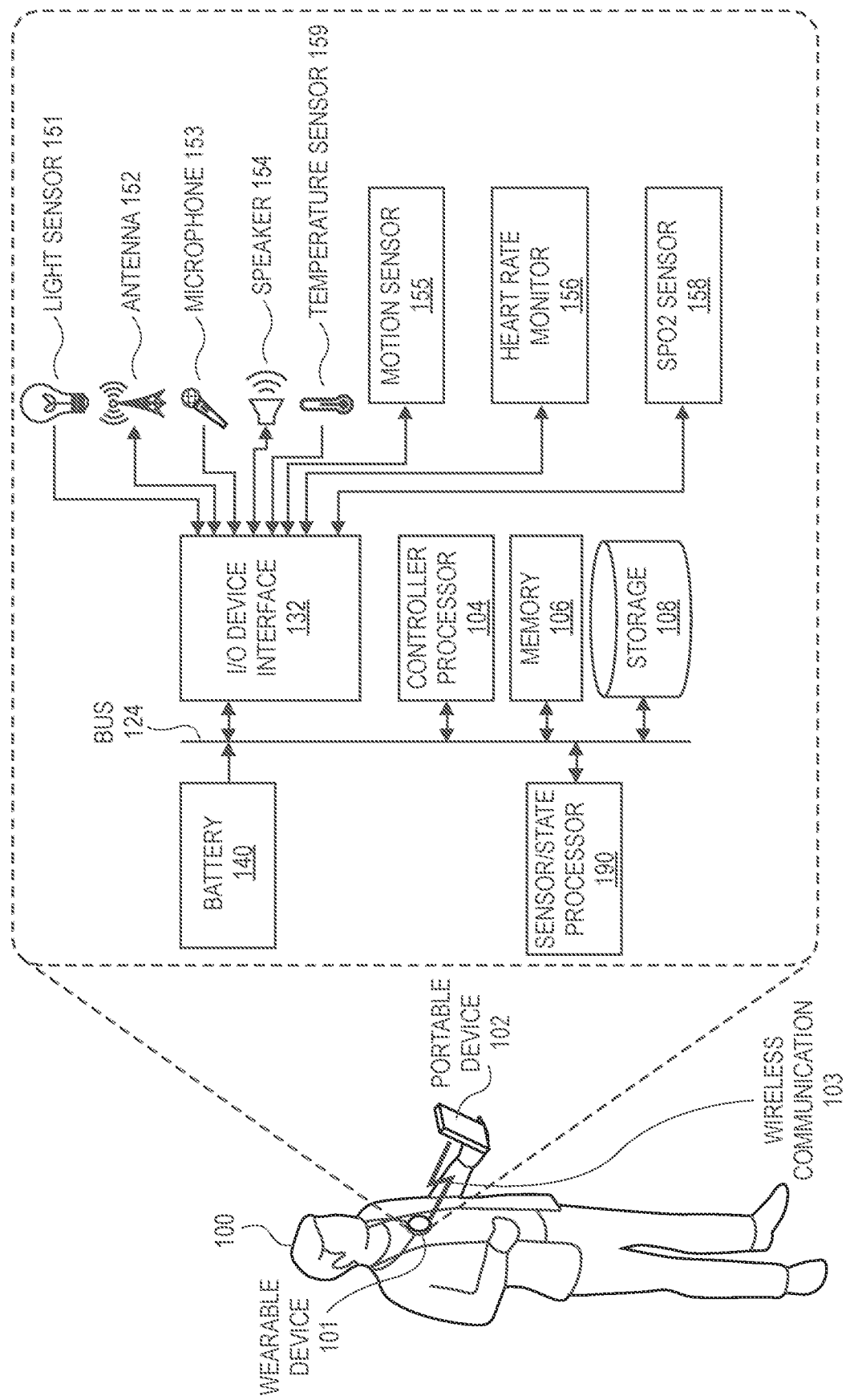
FIG. 1 is an example diagram of a wearable device apparatus and a portable device of a user, in accordance with described implementations.

Described is a system, method, and apparatus that detects keywords in one or more speech segments to authenticate that the speech is generated by the speaker as part of an intentional enrollment by the speaker into a service. For example, as a speech segment is received as part of an enrollment process, the speech segment may be converted into a log melspectrogram. The resulting log melspectrogram may be processed using one or more machine learning models to determine if an expected keyword is represented by the log melspectrogram. If the keyword is detected, it may be determined that the speech output by the speaker is output as part of an intentional enrollment process. If the keyword is not detected, it may be determined that the speech output by the speaker is not output by the speaker as part of an intentional enrollment process. In some implementations, a series of two or more speech segments and corresponding keyword detections may be required before a confirmation is made as to whether speech is output by the speaker as part of an intentional enrollment process.

As a particular example, but not by way of limitation, a voice enrollment process in a service may be initiated. As part of the voice enrollment process, a phrase to be read aloud by a speaker enrolling in the voice service may be presented to the speaker (e.g., on a display of a portable device). The phrase may include a particular keyword that a machine learning model has been trained to detect from an input log melspectrogram.

As the phrase is presented, a microphone may be used to record audio data of the environment with the purpose of recording audio data that includes the speaker verbally speaking the presented phrase. The recorded audio data may then be converted into a log melspectrogram. The log melspectrogram may then be processed by the trained machine learning model to determine if the keyword included in the phrase is detected in the log melspectrogram. If the keyword is detected, the enrollment process may continue and/or the speaker may be authenticated as intentionally enrolling in the voice service.

In comparison, if the keyword is not detected, the enrollment process may not continue and/or the voice enrollment process may request that the speaker repeat the phrase. In another example, even if the keyword is not detected, the voice enrollment process may continue and the speaker may be requested to speak one or more additional phrases that may include the same and/or different keywords. As those additional phrases are presented, additional audio data segments may be generated, converted into log melspectrograms, and determinations made by the machine learning model as to whether one or more keywords for which the machine learning model is trained are detected in the log melspectrogram of those additional phrases.

Enrollment of the speaker may then be authenticated if a defined number of keywords were detected in the plurality of audio data segments that were recorded during the enrollment process. For example, if three phrases were presented, each with a different keyword, and the disclosed implementations determine that two or more keywords were detected in the log melspectrograms generated by audio data recorded while those phrases were presented, it may be determined that the speaker is intentionally enrolling in the voice service.

In comparison, if it is determined that less than two keywords were detected, it may be determined that the speaker is not intending to enroll in the voice service.

Speech authentication prevents potential malicious behavior. For example, the disclosed implementations prevent a malicious actor from activating a voice enrollment service and having audio data that includes speech of an unsuspecting party recorded and a voice profile generated for that unsuspecting party. Specifically, if the unsuspecting party is just speaking (e.g., talking on the phone, talking to another person, etc.), rather than reading one or more presented phrases that include keywords, the likelihood of that unsuspecting party generating audio data that includes the keywords for which the machine learning model is trained to detect is minimal, or non-existent. The risk is even further reduced in some implementations by requiring the detection of multiple keywords, which may be required to be spoken in a particular order, and through selection of uncommon words that are not likely to be spoken unless intentionally as part of the enrollment process.

While the disclosed implementations focus primarily on authenticating whether speech recorded as part of a voice enrollment service is speech from a user that is intentionally enrolling in the voice enrollment service, the disclosed implementations may be used to detect any keyword in any audio data and should not be considered limited to voice enrollment service authentication.

Converting audio data into a log melspectrogram and processing the log melspectrogram with a machine learning model trained to detect one or more keywords provides several technical advantages. For example, speech processing engines, such as automatic speech recognition ("ASR") and/or natural language understanding ("NLU") are not needed to detect the keywords. Indeed, the disclosed implementations do not even determine content of the speech output by the speaker. Rather conversion of the audio data into a log melspectrogram and processing that log melspectrogram with a trained machine learning model is more akin to image matching rather than speech processing. As such, the processing requirements needed to determine if a keyword is included in audio data is significantly reduced. For example, in some implementations, the entire processing of audio data as part of the authentication service may be performed on a portable device, such as a cellular phone, tablet, wearable device, etc., and no data or processing need be sent off the portable device.

In addition, because the machine learning model may be trained to only recognize a small set of keywords that are expected to be spoken as part of an enrollment process, the processing time is significantly reduced, the memory required to store the machine learning model is greatly reduced, and the accuracy of the results are greatly increased compared to processing the entire audio data with one or more speech processing algorithms (e.g., NLU, ASR) in an effort to detect the keywords. Due to these benefits and other benefits discussed herein, in some instances, the disclosed implementations may be performed entirely on a portable device and/or a wearable device. Accordingly, in implementations performed entirely on a portable device and/or wearable device, recorded audio data need not be transmitted and/or sent to remote computing resources, thereby increasing security of the audio data being processed.

FIG. 1 is an example diagram of a wearable device apparatus 101 and a portable device 102 of a user 100, in accordance with described implementations.

The portable device 102 may be any type of portable device, including, but not limited to, a cellular phone (aka smart phone), tablet, touch-pad, laptop, etc. As discussed further below with respect to FIGS. 8-9, the portable device may include a display, such as a touch-based display and a wireless communication interface, such as 802.15.4 (ZIG-BEE), 802.11 ("WI-FI"), 802.16 ("WiMAX"), BLUETOOTH, Z-WAVE, Near Field Communication ("NFC"), etc., to enable wireless communication 103 with the wearable device 101.

The wearable device apparatus 101 may be any form of wearable device. For example, the wearable device apparatus may be in the form of a wristband, a necklace (as illustrated in FIG. 1), headphones, a ring, a watch, an earring, a headband, glasses, an article of clothing, an on-skin apparatus (e.g., an adhesive patch), etc.

In operation, the wearable device 101 may include a battery 140 and/or other power source, computer-readable and computer-executable instructions, one or more sensor/state processors 190 that may include a central processing unit (CPU) 104 for processing sensor data, computer-readable instructions, etc., and a memory 106 for storing data and instructions of the wearable device apparatus. The memory 106 may individually include volatile random access memory (RAM), non-volatile read only memory (ROM), non-volatile magnetoresistive (MRAM) and/or other types of memory. The wearable device 101 may also include a data storage component 108 for storing data, controller/processor-executable instructions, machine learning models, etc. Each data storage component may individually include one or more non-volatile storage types such as magnetic storage, optical storage, solid-state storage, etc.

Computer instructions for operating the wearable device 101 and its various components may be executed by the controller(s)/processor(s) 104, using the memory 106 as temporary "working" storage at runtime. A wearable device's 101 computer instructions may be stored in a non-transitory manner in non-volatile memory 106, storage 108, or an external device(s). Alternatively, some or all of the executable instructions may be embedded in hardware or firmware on the wearable device 101 in addition to or instead of software.

The wearable device 101 also includes an input/output device interface 132. A variety of components may be connected through the input/output device interface 132. Additionally, the wearable device 101 may include an address/data bus 124 for conveying data among components of the wearable device. Each component within the wearable device 101 may also be directly connected to other components in addition to (or instead of) being connected to other components across the bus 124.

The wearable device 101 may be "headless" and may primarily rely on spoken commands for input and/or through interaction with one or more control interfaces or buttons. In other examples, the wearable device 101 may include a display, which may allow a touch-based interface. The wearable device 101 may also include input/output device interfaces 132 that connect to a variety of components such as an audio output component, such as a speaker 154. The wearable device 101 may also include an audio capture component. The audio capture component may be, for example, a microphone 153 or array of microphones, etc. The microphone 153 may be configured to capture audio, such as environmental noises, voices, speech, etc. As noted above, in some implementations, the wearable device 101 may also include a display and/or an audio output (e.g., speaker).

The wearable device 101 may also include other sensors that collect sensor data that may be representative of user data and/or the environment in which the user is located. Any number and/or type of sensors may be included in the device. In the illustrated example, in addition to the microphone, the wearable device 101 may include a light sensor 151 that may measure the ambient light, one or more temperature sensors 159 that may measure the ambient temperature and/or measure the temperature of the user when wearing the wearable device, a motion sensor 155, such as an accelerometer, gyroscope, etc., to measure movement of the user, a heartrate monitor 156 to measure the heartrate of the user, an SpO2 sensor 158 to measure the saturation percentage of oxygen in the blood, a blood pressure sensor, and/or other sensors/monitors to measure other user data and/or environment data.

The wireless device 101 may also include a communication interface, such as an antenna 152 to enable wireless communication 103 between the wearable device 101 and the portable device 102. Any form of wireless communication may be utilized to facilitate communication between the wearable device 101 and the portable device 102, and/or other devices local to the user and/or associated with the user. For example, any one or more of ZIGBEE, WI-FI, WiMAX, BLUETOOTH, Z-WAVE, NFC, etc., may be used to communicate between the wireless device 101 and the portable device 102, etc. For example, the wearable device 101 may be configured to transmit sensor data and/or audio data received from the wearable device 101.

While the above example references both sensors and monitors that collect data about a user and/or the environment, for ease of discussion, unless explicitly stated otherwise, sensors, as used herein, generally refers to sensors and/or monitors that collect data, referred to herein generally as sensor data, corresponding to a user or the environment.

FIGS. 2A-2D illustrate an example transition diagram of an authentication of an intended speech as part of an enrollment process, in accordance with described implementations.

The example speech authentication begins when a first phrase is presented on a display of a portable device 202, as in 210-1. In this example, the first phrase presented on the display of the portable device 202 is the beginning of the Constitution of the United States—"We the People of the United States, in Order to form a more perfect Union, establish Justice, insure domestic Tranquility, provide for the common defense, promote the general Welfare, and secure the Blessings of Liberty to ourselves and our Posterity, do ordain and establish this Constitution for the United States of America." The phrase may be any phrase or series of words and the presented phrase is provided only as an example. Likewise, the keyword from the phrase may be any word or combination of words from that phrase. However, to increase the likelihood of accurate detection, the keyword may be a word that is not commonly spoken, for example any of the words "tranquility," "blessings," "posterity," and/or "ordain" are not words commonly spoken in today's society and therefore may be good candidates for keywords included in the first phrase. In some implementations, multiple keywords may be included in a phrase. In other implementations, only one keyword may be included in a phrase. In still other examples, a keyword may be a series of two or more words, such as "domestic Tranquility."

Regardless of the keyword(s) selected, as discussed further below, a machine learning model may be trained to process an input, in the form of a log melspectrogram to determine if the keyword is included in the speech. In examples where multiple keywords are anticipated to be detected over a series of phrases, such as the examples illustrated with respect to FIGS. 2A-2D and 3A-3D, a single machine learning model may be trained to determine probability scores for each potential keyword. In other examples, different machine learning models may be trained, one for each different keyword(s) anticipated from a phrase.

Returning to FIG. 2A, as the first phrase is presented on the display of the portable device 202, a microphone of the portable device 202 may be activated and generate audio data representative of audio in the environment in which the portable device 202 is located, as in 210-3. In this example, the audio data will include the first speech output by the user 200, as in 210-2. Because in the example illustrated by FIGS. 2A-2D the user 200 is intending to enroll in the voice service, the first speech output by the user 200 is the user reading aloud (speaking) the phrase presented on the display of the device 202.

In addition to the portable device recording first audio data while the first phrase is presented on the display of the portable device 202, the wearable device 201 may also generate and record first wearable device audio data using a microphone of the wearable device 201, as in 210-3'. Because the quality of the microphones of the portable device and the wearable device may be different and/or the location of those microphones may vary with respect to the speaker 200, it may be beneficial to record audio data by both devices.

Once the first audio data is recorded at the portable device 202, a pre-processor of the portable device 202 converts the first audio data into a first log melspectrogram, as in 210-4. Conversion of audio data into a log melspectrogram is discussed further below with respect to FIGS. 7A and 7B.

The first log melspectrogram may then be provided as an input to a trained machine learning model and processed by the machine learning model to determine at least a first keyword probability score indicative of a first probability that a first keyword for which the trained machine learning model was trained is represented by the log melspectrogram, as in 210-5. As discussed herein, the machine learning model may be trained to detect multiple keywords from input log melspectrograms. In such an implementation, the trained machine learning model may generate, for an input log melspectrogram, keyword probability scores for each keyword for which it was trained indicating respective probabilities that the keyword is represented by the input log melspectrogram. As discussed below, in instances where the audio data is segmented into multiple defined length audio data segments and log melspectrograms generated for each defined length audio data segment (FIG. 7B), each of those log melspectrograms may be provided to the trained machine learning model and the probability scores output by the trained machine learning model for each of those log melspectrograms may be considered together to determine if the recorded audio data includes the keyword.

Returning to FIG. 2A, in this example, it is determined that the first keyword probability score output by the machine learning model exceeds a first confidence threshold, as in 210-6. In some implementations, different confidence thresholds may be assigned to some or all of the keywords and the disclosed implementations may determine if a log melspectrogram includes a keyword if the keyword probability score exceeds the confidence threshold associated with the keyword. The confidence thresholds may be adjusted individually for each keyword to increase or decrease the sensitivity of the disclosed implementations in detecting the respective keyword.

Figure 2A:
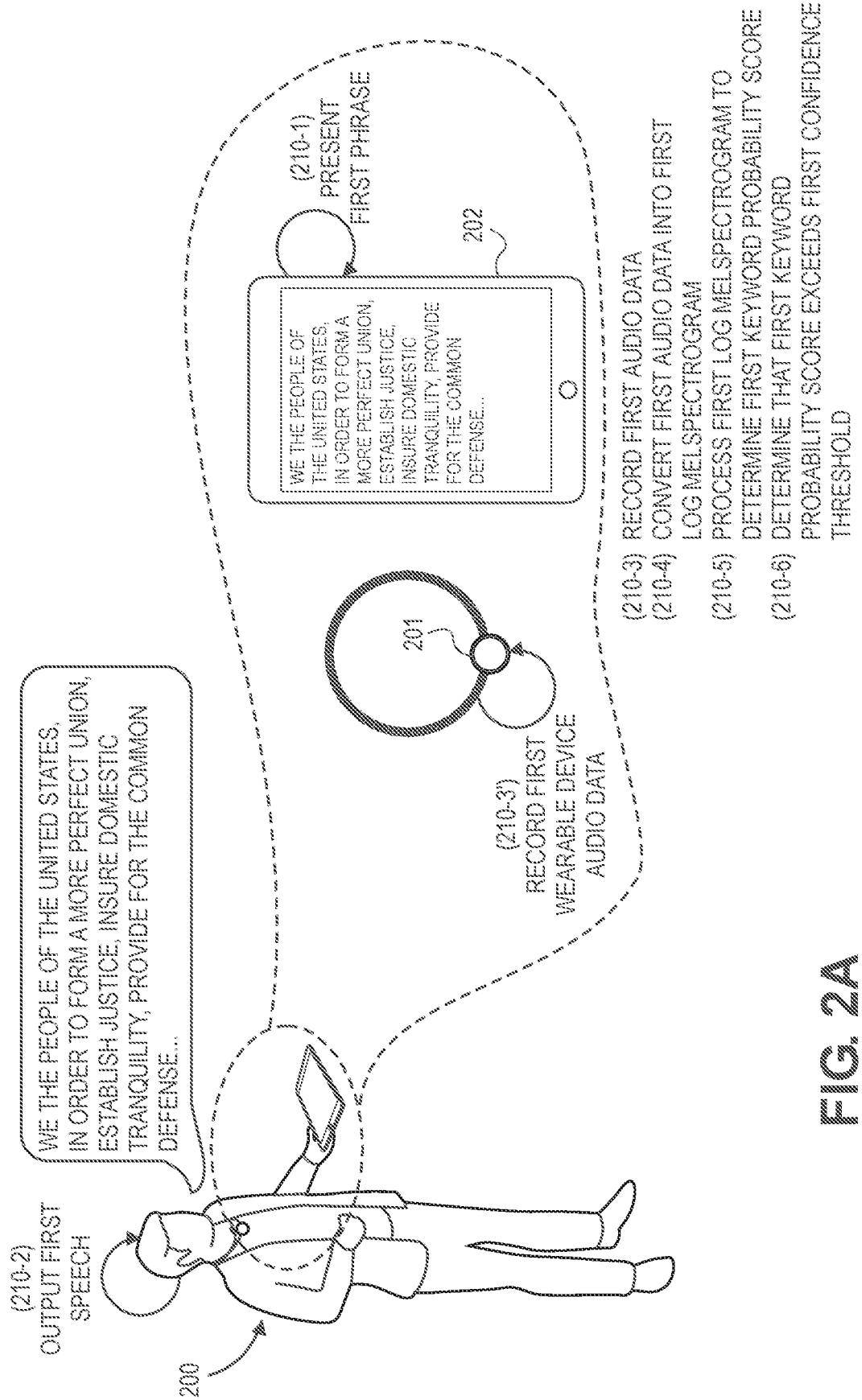
FIGS. 2A-2D illustrate an example transition diagram of an authentication of intended speech of a speaker as part of an enrollment process, in accordance with described implementations.
Figure 2B:
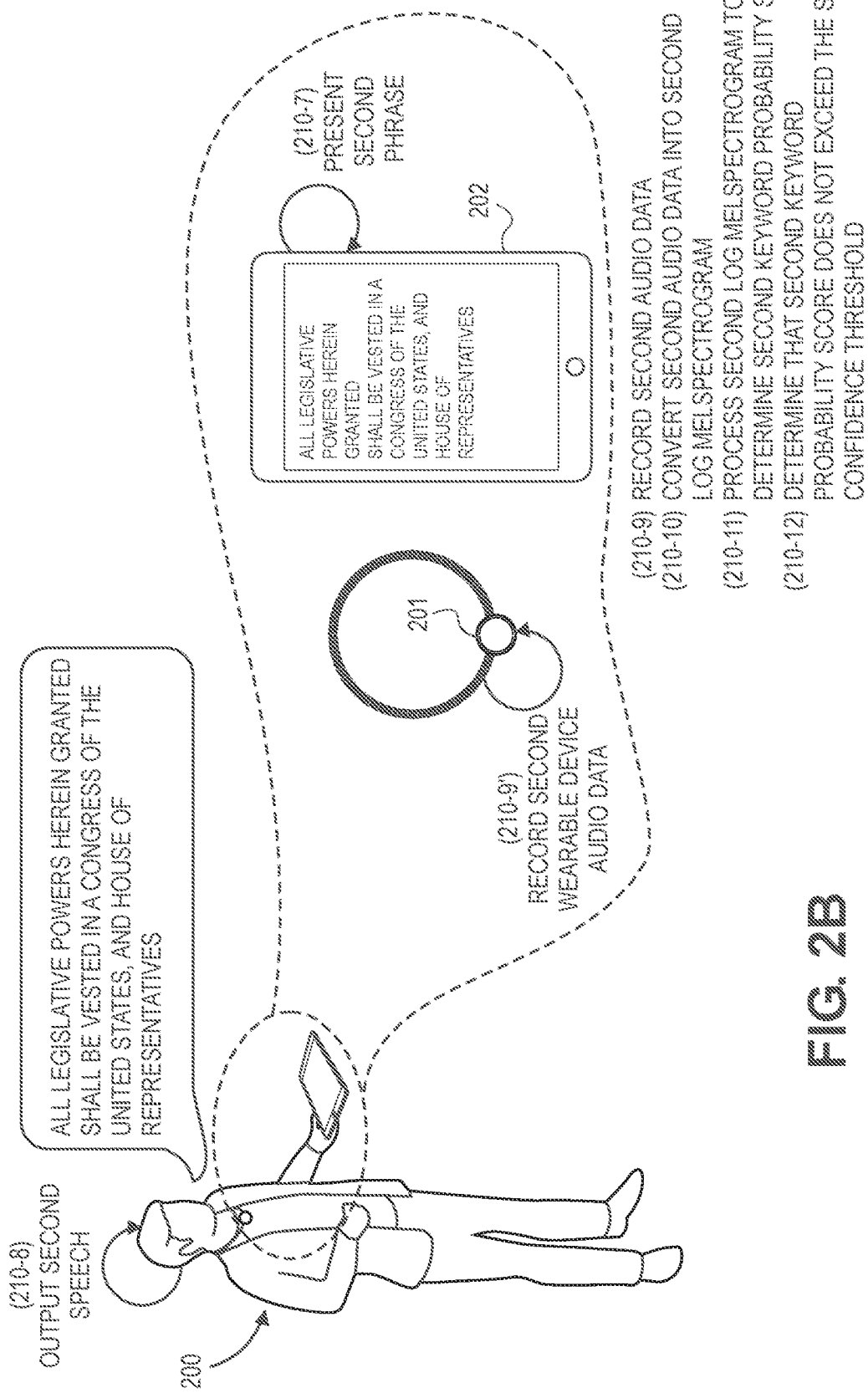

Turning now to FIG. 2B, in this example, the voice enrollment process requires that several phrases be spoken as part of the enrollment process. Accordingly, as illustrated in FIG. 2B, a second phrase may be presented on the display of the portable device 202, as in 210-7. In this example, the second phrase of the enrollment process is Article I, Section I of the Constitution of the United States—"All legislative Powers herein granted shall be vested in a Congress of the United States, which shall consist of a Senate and House of Representatives." As with the above, any word or series of two or more words included in the second phrase may be a keyword for which the machine learning model is trained. For example, keywords in the above example second phrase may be "legislative," "vested," and/or "which shall consist." In other examples, other words or combinations of words may be selected as keywords.

As the second phrase is presented on a display of the portable device, second audio data is generated and recorded by the portable device, as in 210-9. Likewise, second wearable device audio data may be generated and recorded by the wearable device 201, as in 210-9'. Similar to FIG. 2A, because the speaker 200 is intending to enroll in the voice service, the audio data includes the second speech output by the speaker, as in 210-8, which is of the speaker reading aloud (speaking) the second phrase presented on the display of the portable device.

The second audio data is then converted into a second log melspectrogram by the pre-processor executing on the portable device, as in 210-10, and provided as another input to the trained machine learning model. The trained machine learning model processes the second log melspectrogram to determine at least a second keyword probability score indicative of a probability that a second keyword is represented by the second log melspectrogram, as in 210-11. As discussed above, the second keyword probability score may be one of several keyword probability scores determined by the machine learning model when processing the second log melspectrogram.

In this example, for whatever reason (e.g., loud environment noise, improper pronunciation of a keyword by the speaker, etc.) it is determined that the second keyword probability score determined for the second keyword based on the input second log melspectrogram does not exceed a second confidence threshold associated with the second keyword, as in 210-12.

Figure 2C:
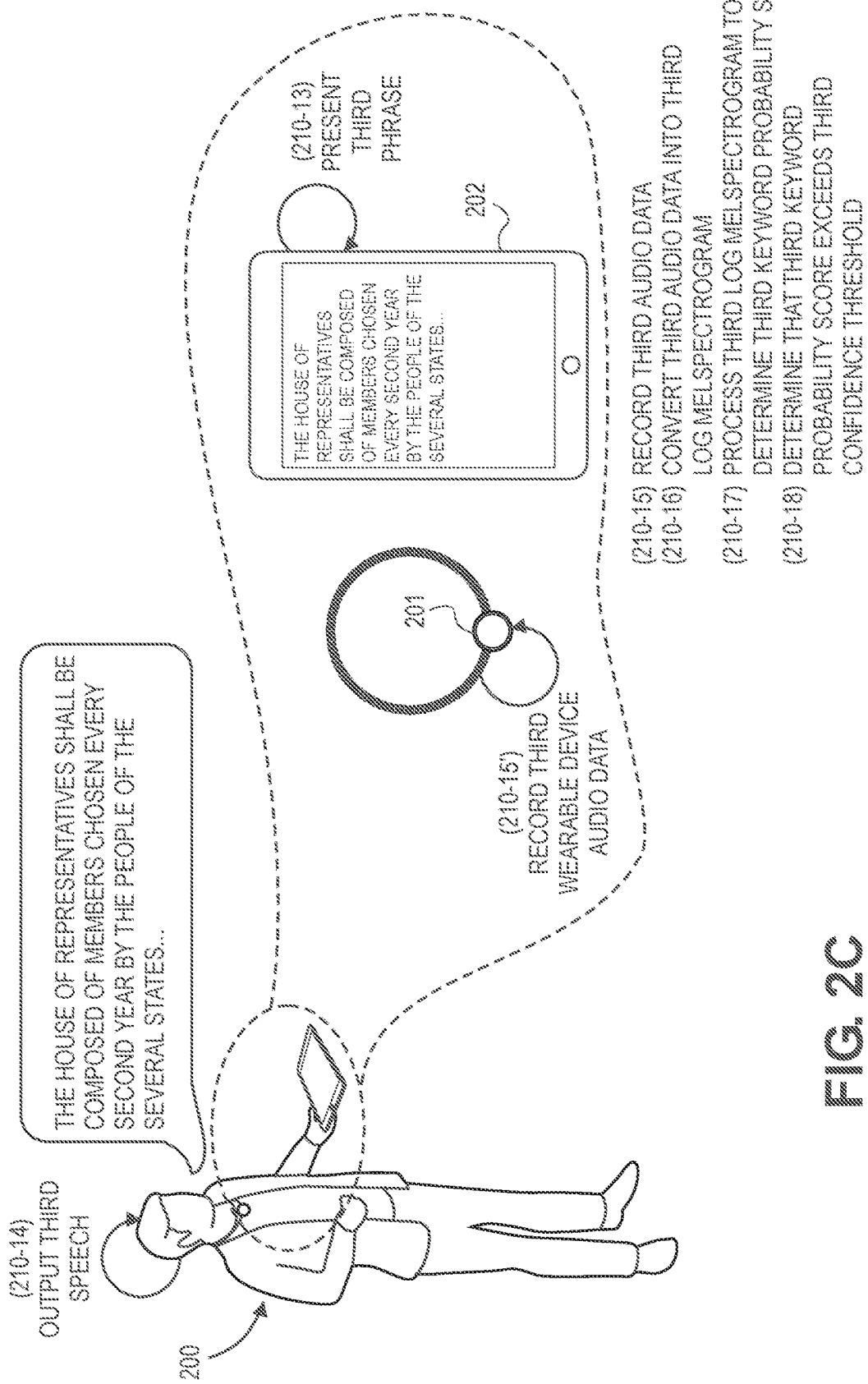

Turning now to FIG. 2C, even though it is determined that the second keyword was not detected in the second audio data, in this example a third phrase is presented on the display of the portable device, as in 210-13. In other examples, if it is determined that a keyword is not detected, the disclosed implementations may request that the phrase be repeated by the speaker. This request for repetition may be performed any number of times until the keyword is detected. In other examples, the request that the phrase be repeated may only be performed until the keyword is detected or until a set number of attempts have been completed before moving to the next phrase. For example, if it is determined that the second keyword is not detected in the second audio data recorded by the portable device while the second phrase is presented, the disclosed implementations may request that the speaker repeat the second phrase and re-record the second audio data. The re-recorded second audio data may, like the original second audio data, be converted to a second log melspectrogram and processed by the machine learning model to produce another second keyword probability score indicative of a probability that the second keyword is represented by the second log melspectrogram generated from the re-recorded second audio data. In such an example, if the number of repetitions is one, regardless of whether the second keyword probability score exceeds the second confidence threshold, the enrollment process may proceed to the third phrase, as illustrated in FIG. 2C. If the number of repetitions that may be requested is greater than one, the disclosed implementations may continue to request that the phrase be repeated until either the keyword is detected or the number of repetitions have completed.

Returning to FIG. 2C, the third phrase in this example is the beginning of Article I, Section 2 of the Constitution of the United States—"The House of Representatives shall be composed of Members chosen every second Year by the People of the several States, and the Electors in each State shall have the Qualifications requisite for Electors of the most numerous Branch of the State Legislature." Like the other presented phrases, any word or combination of words, such as "composed," "requisite," "most numerous," etc., may be selected as keywords.

As the third phrase is presented on the display of the portable device 202, third audio data of the environment around the portable device may be generated and recorded by the portable device, as in 210-15. Likewise, the wearable device 201 may generate a record third wearable device audio data, as in 210-15'. Again, because in this example the speaker 200 is intending to enroll in the voice service, the third audio data will include the third speech output by the speaker, which is the speaker reading aloud (speaking) the third phrase, as in 210-14.

The pre-processor of the portable device 202 converts the third audio data to a third log melspectrogram, as in 210-16, and the machine learning model processes the third log melspectrogram to determine at least a third keyword probability score indicative of a probability that the third keyword is represented by the third log melspectrogram, as in 210-17. In this example, it is determined that the third keyword probability score exceeds a third confidence threshold corresponding to that third keyword, as in 210-18.

Figure 2D:
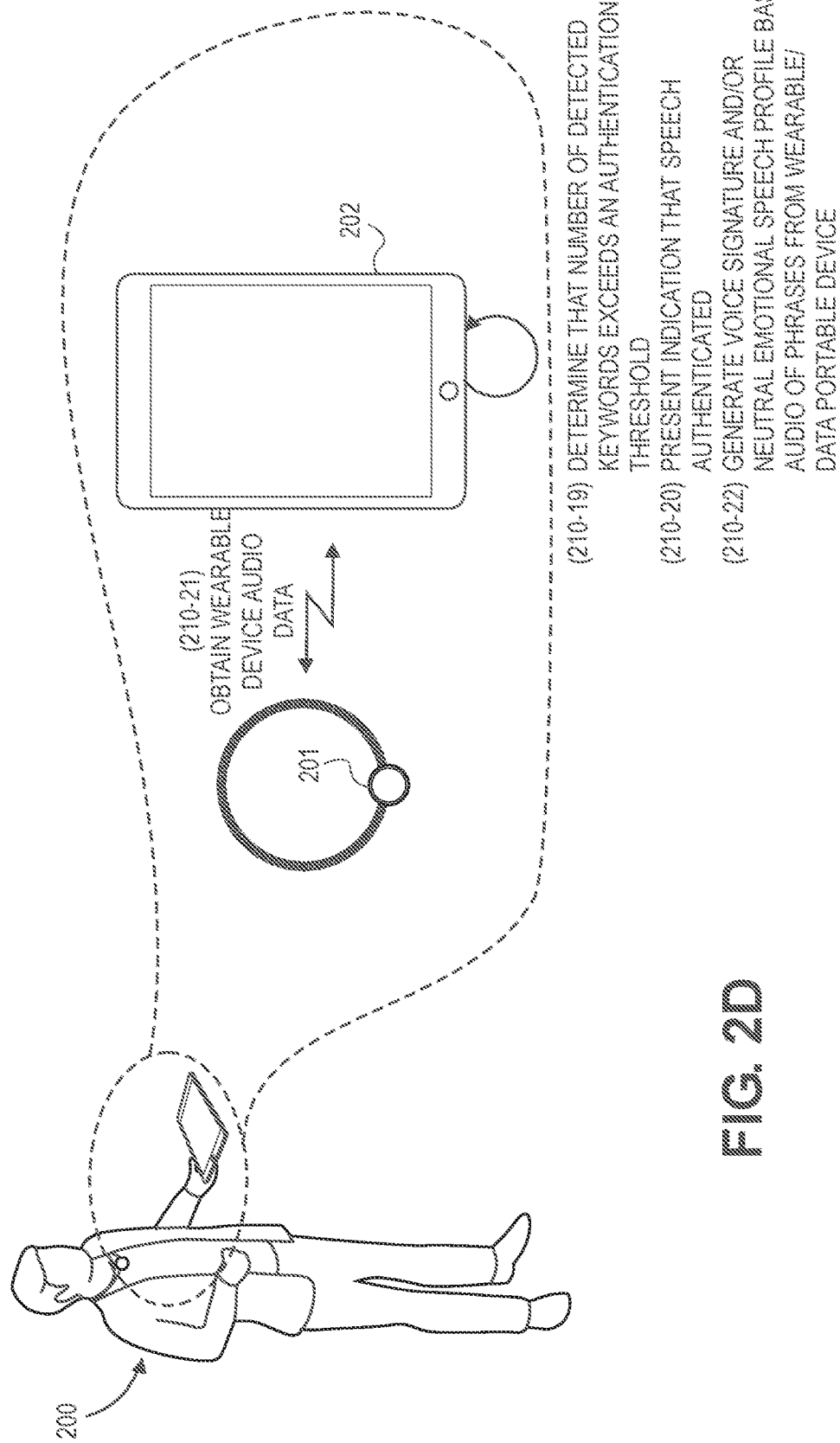

Turning now to FIG. 2D, once audio data for each presented phrase has been generated and processed, in this example three phrases, a determination is made as to whether the number of detected keywords exceeds an authentication threshold required as part of the authentication of the speaker, as in 210-19. The authentication threshold may be any number of positive keyword detections necessary to affirmatively authenticate that the speaker is intending to enroll in the voice service. In the illustrated example, the authentication threshold is that at least two of the three keywords must be detected. In other examples the authentication threshold may be higher or lower.

In this example, because the authentication threshold requires two or more keywords be detected and two of the three keywords were detected in the audio data, the speech is authenticated, the speaker is determined to be intending to enroll in the voice service, and a presentation is presented on the display of the portable device, as in 210-20. In this example, once authenticated, the portable device 202 may send an instruction or signal to the wearable device 201 causing the wearable device to provide the wearable device audio data generated during the enrollment process to the portable device, as in 210-21. As noted above, in some examples, the wearable device 201, during the enrollment process may generate wearable device audio data (e.g., first wearable device audio data, second wearable device audio data, third wearable device audio data). Once the speaker is authenticated as intending to enroll in the voice service, the wearable device audio data may be obtained by the portable device 202 from the wearable device 201, as in 210-21. In addition, in this example, the wearable device audio data and/or the audio data generated by the portable device (e.g., the first audio data, the second audio data, and the third audio data) may be used to generate a voice signature representative of the voice of the speaker 200 and/or a neutral emotional speech profile of the user 200, as in 210-22.

The voice signature may include one or more embedding vectors produced from the audio data generated by the portable device and/or the wearable device audio data generated by the wearable device during the enrollment process. For example, a first embedding vector may be generated based on the audio data generated by the portable device, a second embedding vector may be generated based on the wearable device audio data generated by the wearable device, and/or a third embedding vector may be generated based on both the audio data generated by the portable device and the wearable device audio data generated by the wearable device during the enrollment process. As will be appreciated, different embedding vectors of the user as part of the voice signature of the user may be beneficial for the different devices because of the differences in the hardware components of the devices (e.g., difference in microphones), and/or the differences in the typical position of those devices with respect to the speaker when the speaker is speaking, i.e., the generated and recorded audio data from the different devices may represent the speech of the speaker differently.

The neutral emotional speech profile may indicate a neutral emotion for the speaker, which may be beneficial in determining the emotion of a user as the user is speaking. The neutral emotional speech profile may be produced from the audio data generated by the portable device and/or the wearable device audio data generated by the wearable device during the enrollment process. The neutral emotional speech profile may indicate, for example, a pitch of the speaker, a tone of the speaker, a cadence of the speaker, etc., when speaking with neutral emotion, as determined from the audio data.

Regardless of how the voice signatures/embedding vectors are generated and/or if other actions are performed in addition to or as an alternative to voice signature/embedding vector generation as part of the enrollment process to the voice service, the disclosed implementations authenticate that the speaker 200 is intending to enroll in the voice service before the voice signatures and/or other actions are performed as part of the enrollment process. Such authentication reduces or eliminates the improper enrollment of an unsuspecting party.

For example, FIGS. 3A-3D illustrate an example transition diagram of a non-authentication of a speech as part of an enrollment process when that speech is generated by a speaker that is determined to not be intending to enroll in the voice service, referred to herein as an unintended party, in accordance with described implementations. In this example, the malicious actor 350 has initiated the enrollment process to enroll in a voice service but is attempting to enroll the speaker 300, an unsuspecting party, in the voice service without the speaker intending to enroll in the voice service.

Figure 3A:
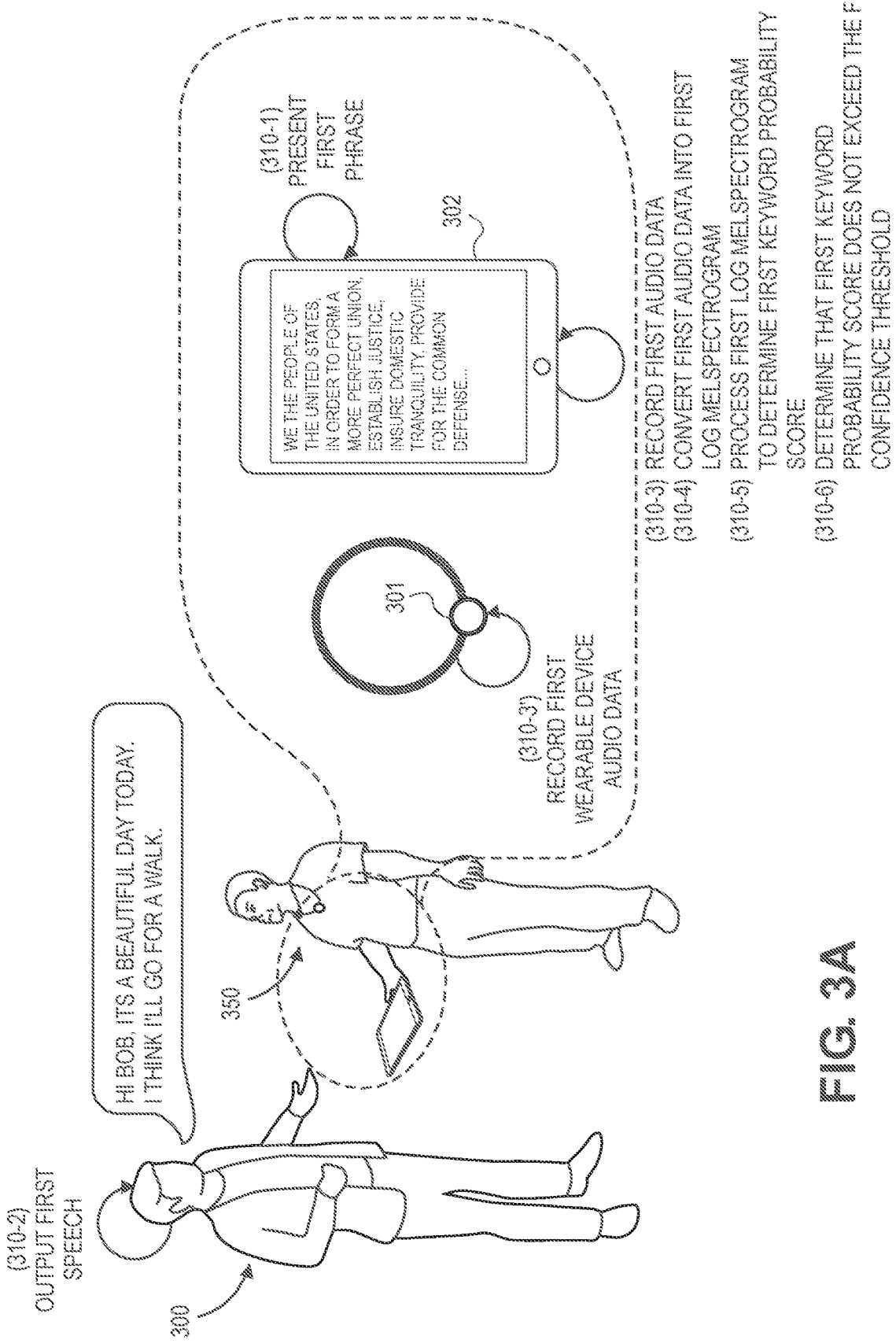
FIGS. 3A-3D illustrate an example transition diagram of a non-authentication of a speech as part of an enrollment process when that speech is generated by a speaker that is determined to not be intending to enroll in the voice service, in accordance with described implementations.

Turning first to FIG. 3A, similar to the discussion above with respect to FIG. 2A, the first phrase is presented on the display of the portable device 302, as in 310-1. To aid in explanation of the difference between the examples discussed with respect to FIGS. 2A-2D compared to FIGS. 3A-3D, the same three phrases are presented in the same order as part of the enrollment processes. However, it will be appreciated that for each attempted enrollment in a voice service, different phrases, different keywords, and/or different order of phrases may be used.

As the first phrase is presented on the display of the portable device 302, first audio data of the environment is recorded by the portable device, as in 310-3, and first wearable device audio data is generated and recorded by the wearable device 301, as in 310-3'. However, because the speaker 300 is not intending to enroll in the voice service, the first speech output by the speaker 300 does not correspond to the first phrase presented on the display of the portable device, as in 310-2. In this example, the speaker outputs the first speech of "Hi Bob, it's a beautiful day today. I think I'll go for a walk." In comparison, as discussed above, the first phrase presented on the display of the portable device 202 is the beginning of the Constitution of the United States "We the People of the United States, in Order to form a more perfect Union, establish Justice, insure domestic Tranquility, provide for the common defense, promote the general Welfare, and secure the Blessings of Liberty to ourselves and our Posterity, do ordain and establish this Constitution for the United States of America."

Similar to the above example, the first audio data is converted by a pre-processor executing on the portable device 302 into a first log melspectrogram, as in 310-4, and the machine learning model processes the first log melspectrogram and outputs at least a first keyword probability score indicative of a probability that the first keyword is included in the first audio data, as in 310-5. In this example, because the speaker 300 did not speak a keyword from the first phrase, it is determined that the first keyword probability score does not exceed a confidence threshold corresponding to the first keyword and thus, the first audio data is determined to not include the first keyword, as in 310-6.

Figure 3B:
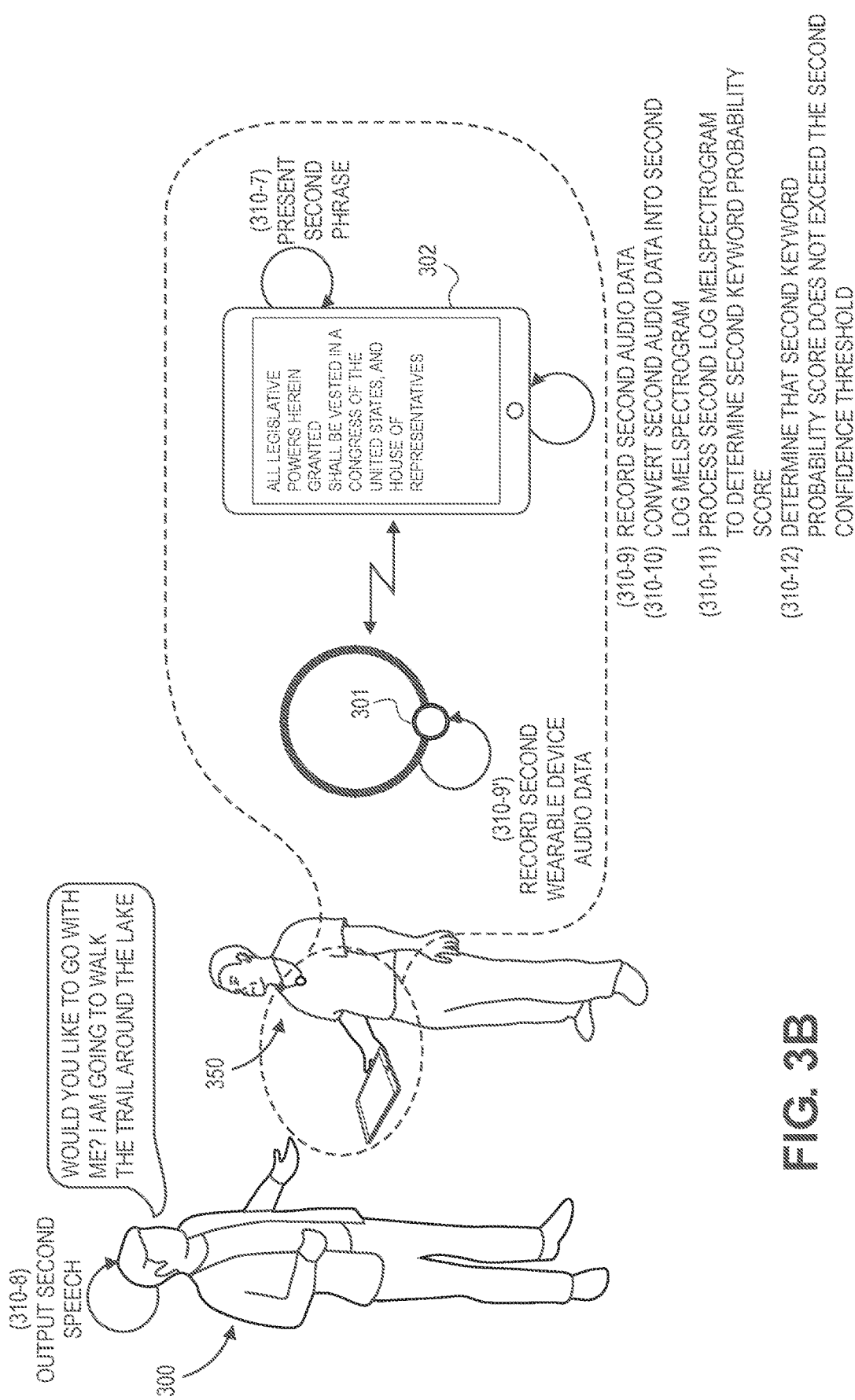

Referring to FIG. 3B, the second phrase of the enrollment process is displayed on the display of the portable device, as in 310-7, and second audio data is generated and recorded by the portable device while the second phrase is presented, as in 310-9. Likewise, the wearable device may likewise generate and record second wearable device audio data while the second phrase is presented on the portable device, as in 310-9'. Again, in this example, because the speaker 300 is not intending to enroll in the voice service, the second speech output by the user, as in 310-8, in this example, "Would you like to go with me? I am going to walk the trail around the lake" does not correspond to the second phrase presented on the display of the portable device, which in this example is Article I, Section 1 of the Constitution of the United States—"All legislative Powers herein granted shall be vested in a Congress of the United States, which shall consist of a Senate and House of Representatives."

As noted above, in some implementations, the authentication process may request that phrases be repeated one or more times if a keyword is not detected until the keyword is detected or a number of repeat requests are completed for the phrase.

Similar to the above, the second audio data is converted to a second log melspectrogram by the pre-processors executing on the portable device 302, as in 310-10, and the machine learning model executing on the portable device 302 processes the second log melspectrogram and outputs at least a second keyword probability score indicative of a second probability that the second log melspectrogram is representative of the second keyword, as in 310-11.

Again, in this example, because the second speech does not include a second keyword, it is determined that the second keyword probability score output by the machine learning model does not exceed the confidence threshold associated with the second keyword, as in 310-12.

Figure 3C:
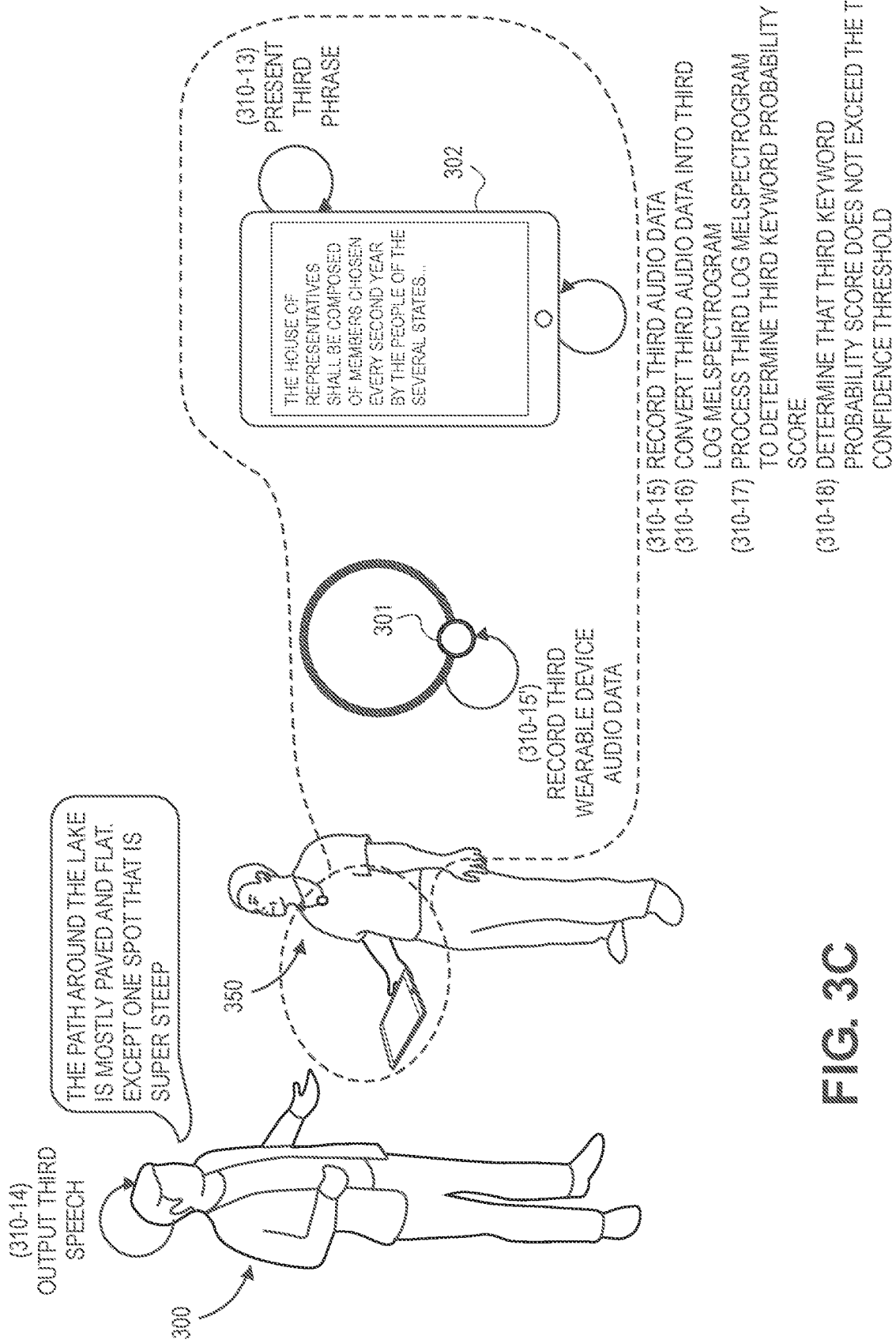

Continuing to FIG. 3C, the third phrase is presented on the display of the portable device 302, as in 310-13, and third audio data is generated and recorded by the portable device while the third phrase is presented on the display of the portable device, as in 310-15. Likewise, the wearable device 301 may generate third wearable device audio data while the third phrase is presented on the display of the portable device, as in 310-15'.

Similar to the above, because the speaker 300 is not intending to enroll, the third speech output by the user, as in 310-14, which in this example is "The path around the lake is mostly flat. Except one spot that is super steep" is different than the third phrase presented on the display of the portable device, which in this example is "The house of Representatives shall be comprised of members chosen every second year by the people of the United States . . . "

The third audio data is then converted by the pre-processors executing on the portable device into a third log melspectrogram, as in 310-16, and processed by the machine learning model executing on the portable device, as in 310-17. As discussed, the machine learning model outputs at least a third keyword probability score indicative of a third probability that the third keyword is represented by the third log melspectrogram. Again, because the speaker 300 is not intending to enroll in the voice service and did not speak a keyword included in the third phrase presented on the display of the portable device, the third keyword probability score is low and it is determined that the third keyword probability score does not exceed the third confidence threshold associated with the third keyword, as in 310-18.

Figure 3D:
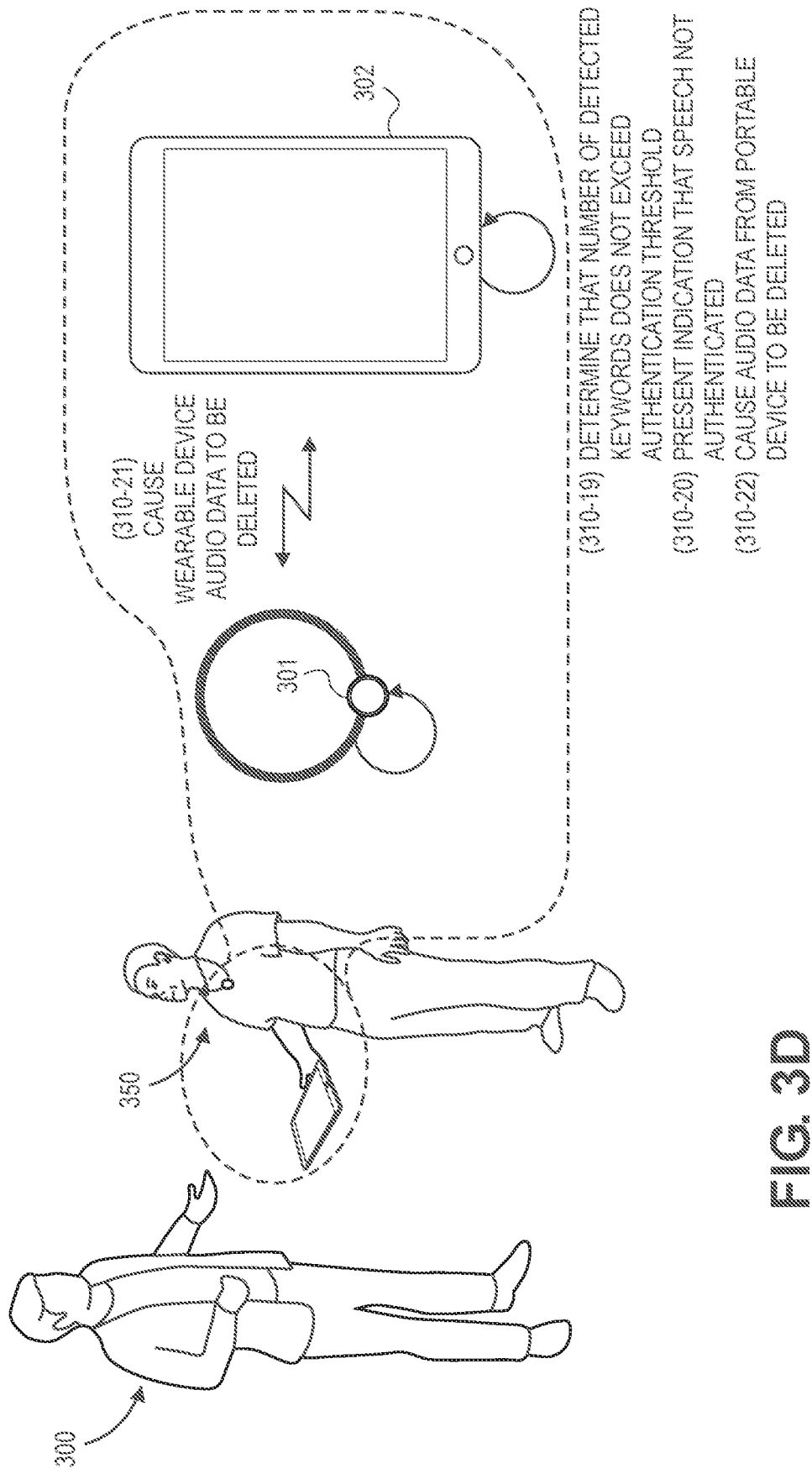

Referring to FIG. 3D, after each of the phrases have been presented, audio data generated, converted into log melspectrograms, and keyword probability scores determined for each segment of audio data, in this example it is determined that the number of detected keywords does not exceed the authentication threshold, as in 310-19.

In response to determining that the number of detected keywords does not exceed the authentication threshold, an indication may be presented on the display of the portable device 302 indicating that authentication of the speech was not confirmed and that speaker was not enrolled in the voice service, as in 310-20. In addition, an instruction or signal may be sent from the portable device 302 to the wearable device 301 instructing or causing the wearable device to delete or otherwise discard the wearable device audio data (first wearable device audio data, second wearable device audio data, third wearable device audio data) generated during the enrollment process, as in 310-21. In addition, the portable device may also delete or otherwise discard the audio data (first audio data, second audio data, third audio data) generated and recorded by the wearable device as part of the enrollment process, as in 310-22.

Deletion of audio data when a speaker is not authenticated with the disclosed implementations ensures the voice signatures/embedding vectors are not generated for unsuspecting parties that are recorded as part of an enrollment process initiated by a malicious actor 350, thereby maintaining the security and privacy of that unsuspecting party.

While the discussions presented herein primarily disclose the implementations being performed on a portable device, in other examples, some or all of the implementations may be performed on one or more devices that are remote to the portable devices, such as remote computing devices and/or wearable devices.

Figure 4:
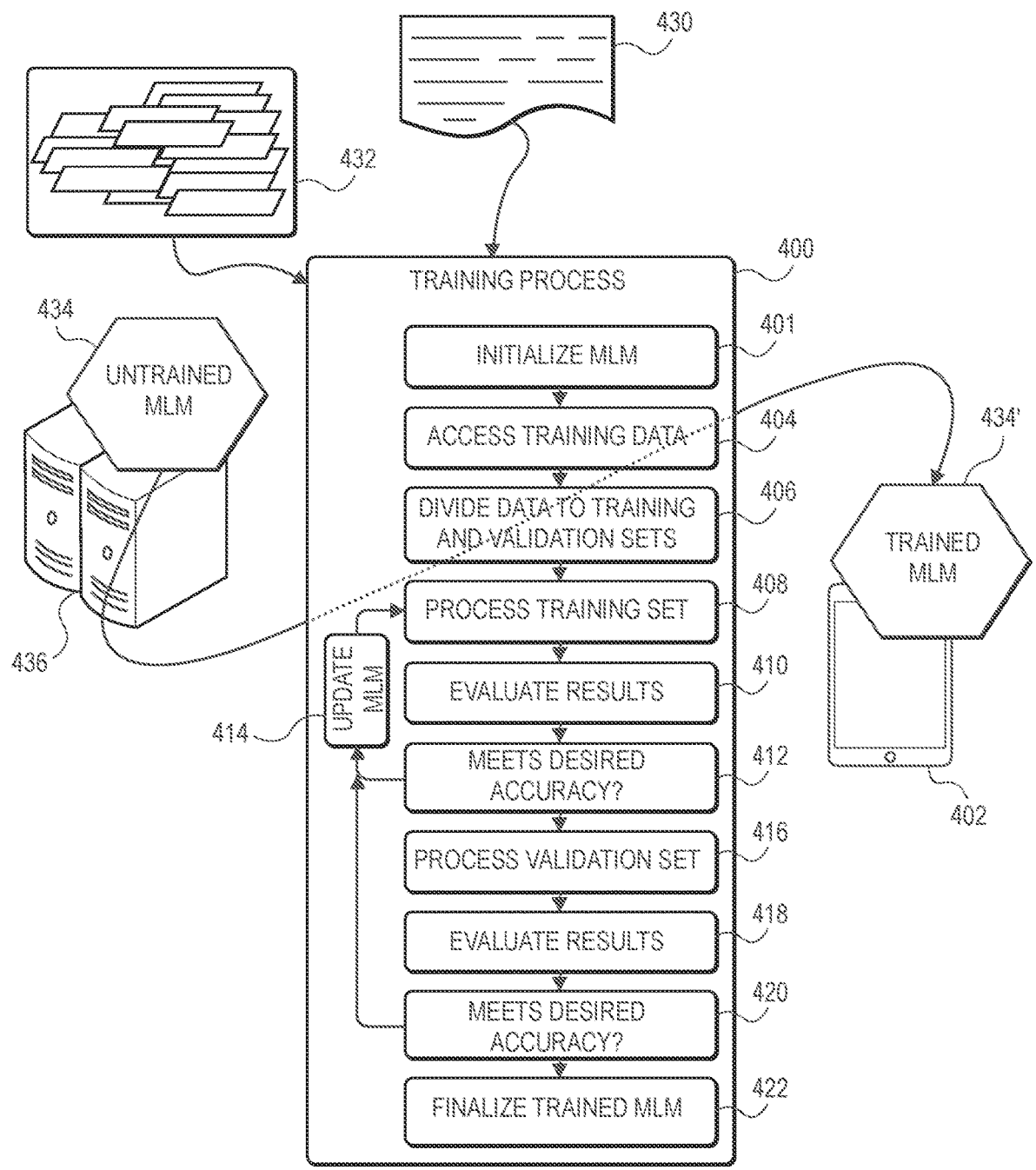
FIG. 4 is a block diagram illustrating an exemplary overall process of training a machine learning model, in accordance with described implementations.

FIG. 4 illustrates an exemplary overall process 400 of training a machine learning model in accordance with aspects of the disclosed subject matter. Indeed, as shown in FIG. 4, the training process 400 is configured to train an untrained machine learning model 434 operating on a computer system 436 to transform the untrained machine learning model into a trained machine learning model 434' that operates on the same or another computer system, such as a portable device 402. In the course of training, as shown in the training process 400, at step 401, the untrained machine learning model 434 is initialized with training criteria 430 comprising one or more of static features, dynamic features, and processing features.

At step 404 of training process 400, a corpus 432 of training data is accessed. According to aspects of the disclosed subject matter, the corpus of training data is representative of the input data (log melspectrograms) that the resulting, trained machine learning model 434' will receive. In various embodiments, the training data is labeled training data, meaning that the actual results of processing of the data items of the corpus of training data (i.e., whether they are valid results or invalid results) are known. Of course, in various embodiments, the corpus 432 of training data may comprise unlabeled training. With the corpus 432 of training data accessed, at step 406 the training data is divided into training and validation sets. Generally speaking, the items of data in the training set are used to train the untrained machine learning model 434 and the items of data in the validation set are used to validate the training of the machine learning model. As those skilled in the art will appreciate, and as described below in regard to much of the remainder of training process 400, there are numerous iterations of training and validation that occur during the training of the machine learning model.

At step 408 of the training process, the data elements of the training set are processed, often in an iterative manner. Processing the data elements of the training set include capturing the processed results. After processing the elements of the training set, at step 410, the aggregated results of processing the training set are evaluated, and at step 412, a determination is made as to whether a desired accuracy level has been achieved. If the desired accuracy level is not achieved, in step 414, aspects of the machine learning model are updated in an effort to guide the machine learning model to generate more accurate results, and processing returns to step 408. Alternatively, if the desired accuracy level is achieved, the training process 400 advances to step 416.

At step 416, and much like step 408, the data elements of the validation set are processed, and at step 418, the processing accuracy of this validation set is aggregated and evaluated. At step 420, a determination is made as to whether a desired accuracy level, in processing the validation set, has been achieved. If the desired accuracy level is not achieved, in step 414, aspects of the machine learning model are updated in an effort to guide the machine learning model to generate more accurate results, and processing returns to step 408. Alternatively, if the desired accuracy level is achieved, the training process 400 advances to step 422.

At step 422, a finalized, trained machine learning model 434' is generated. Typically, though not exclusively, as part of finalizing the now-trained machine learning model 434', portions of the machine learning model that are included in the model during training for training purposes are extracted, thereby generating a more efficient trained machine learning model 434'.

As discussed, because the trained machine learning model 434' utilized in the disclosed implementations is trained to identify a relatively small set of keywords based on log melspectrograms of those keywords, the size of the trained machine learning model 434' may be relatively small. As such, the trained machine learning model 434' may be included and executed on low power devices, devices with limited memory availability, devices with limited processing capabilities, etc.

Figure 5:
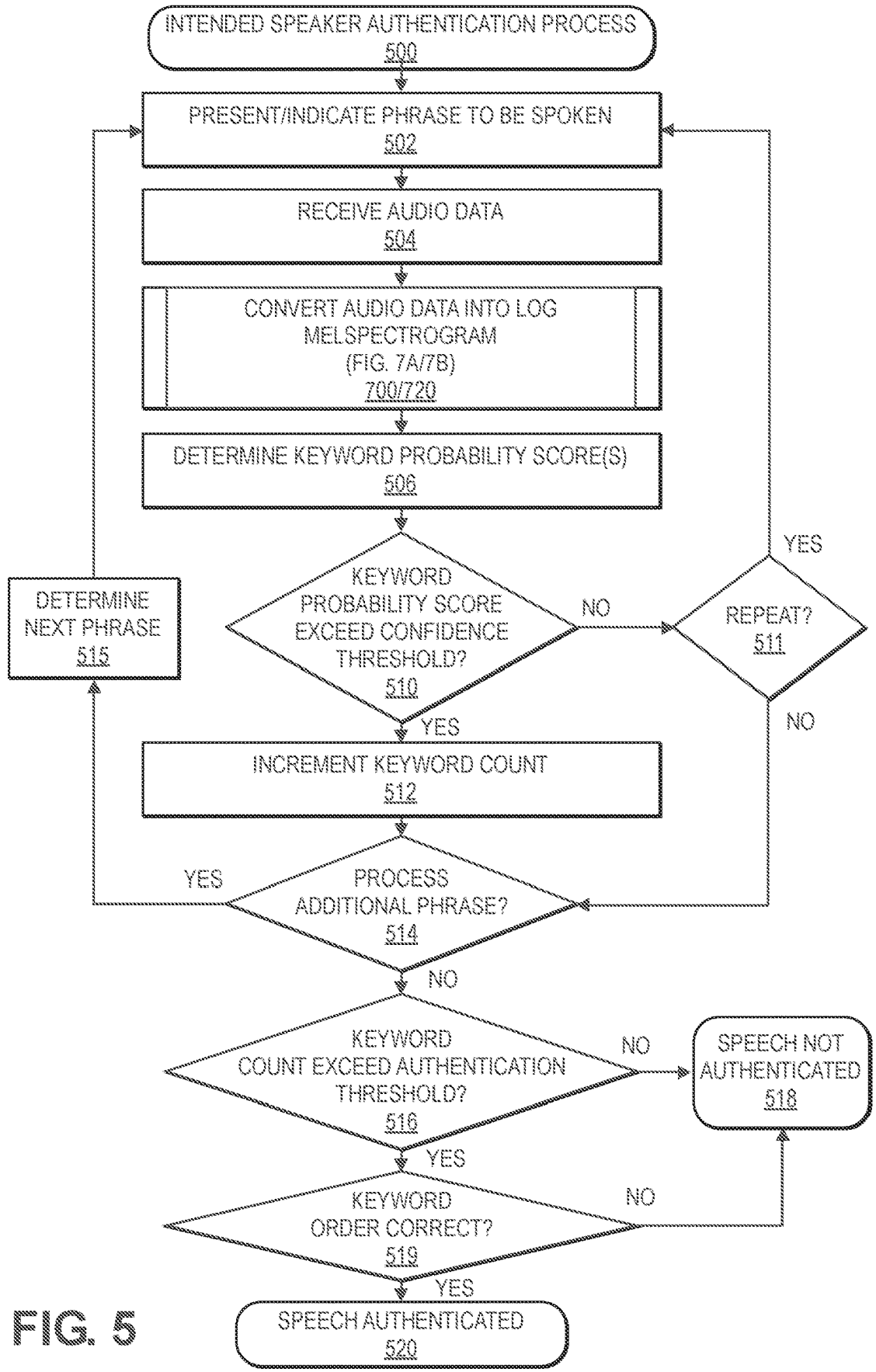
FIG. 5 is an example intended speaker authentication process, in accordance with described implementations.

FIG. 5 is an example intended speaker authentication process 500, in accordance with described implementations.

The example process 500 begins by presenting or otherwise indicating a phrase to be spoken by the speaker, as in 502. As discussed above, the phrase may be presented on a display of a device, such as a portable device. In other implementations, the phrase need not be affirmatively displayed. For example, an indication of a page, chapter, section, etc., of a book or other printed material known to the example process 500 and accessible by the speaker may be indicated to the speaker as the phrase to be spoken.

After or as the phrase is provided or presented, audio data is received, as in 504. For example, a microphone on a portable device and/or wearable device associated with, worn by, or near the user may be activated that generates audio data of the environment. In other examples, audio data may be generated by another device and provided to the example process 500.

Upon receipt of the audio data, the audio data is converted into a log melspectrogram, as in 700/720. Conversion of audio data into a log melspectrogram is discussed further below with respect to FIGS. 7A and 7B.

The log melspectrogram is processed, for example using a trained machine learning model as discussed above, to determine one or more keyword probability scores for keywords upon which the machine learning model is trained to identify from log melspectrogram inputs, as in 506. In examples in which the audio data is segmented into a plurality of defined length audio data segments and log melspectrograms generated for each defined length audio data segment (FIG. 7B), each of those log melspectrograms may be processed and the outputs, such as the one or more keyword probabilities scores, considered together as representative of the probabilities as to whether a keyword is included in the audio data.

A determination is then made as to whether a keyword probability score exceeds a confidence threshold, as in 510. As discussed above, one or more confidence thresholds may exist. For example, each potential keyword may have a corresponding confidence threshold and some or all of the confidence thresholds may be different. For example, a first keyword may have a first confidence threshold and a second keyword may have a second confidence threshold that is different than the first confidence threshold. Confidence thresholds may be different for different keywords to account for variability in the accuracy of keyword detection and/or difficulty in training to a machine learning model to identify the keyword from a log melspectrogram.

If it is determined that a keyword probability score determined from the log melspectrogram exceeds a confidence threshold, a keyword count for the authentication process is incremented, thereby indicating that a keyword has been detected in a phrase spoken by a speaker, as in 512. If it is determined that the keyword probability score does not exceed the confidence threshold, a determination is made as to whether the phrase is to be repeated, as in 511. For example, in some implementations, it may be determined that a phrase is to be repeated until the keyword probability score exceeds the confidence threshold or a defined number of repeated attempts have been performed (e.g., three). If it is determined that the phrase is to be repeated, the example process 511 returns to block 502 and continues by presenting the same phrase again.

If it is determined at decision block 511 that the phrase is not to be repeated, or after incrementing the keyword count at block 512, a determination is made as to whether additional phrases are to be processed as part of the example process 500, as in 514.

If it is determined that additional phrases are to be processed, a next phrase is determined, as in 515, and the example process 500 returns to block 502 and continues by presenting/indicating the determined next phrase. If it is determined at decision block 514 that additional phrases are not be processed, a determination is made as to whether the keyword count exceeds an authentication threshold, as in 516. The authentication threshold may be any number or indicator that must be satisfied before a speaker is authenticated by the example process 500 as intending to enroll in a voice service, as discussed herein. The authentication threshold may vary for different potential speakers, based on the number of phrases presented, based on the time of year, based on the time of day, etc.

If it is determined that the keyword count exceeds the authentication threshold, in some implementations a further determination may be made as to whether the order in which the keywords were detected corresponds to an expected order and/or order in which the phrases were presented, as in 519. In some implementations, this determination may be omitted.

If it is determined at decision block 516 that the keyword count does not exceed the authentication threshold or if it is determined at decision block 519 that the order in which the keywords were received does not match an expected order, the speech is not authenticated and the speaker that output the speech is determined to not be an intended speaker and not intending to enroll in a voice service, as in 518. If it is determined at decision block 519 that that the detected keywords were received in the expected order, or if decision block 519 is omitted and it is determined at decision block 516 that the keyword count exceeds the authentication threshold, the speech is authenticated and the enrollment process may continue, as in 520. For example, upon authentication of the speech, a voice signature, which may include one or more embedding vectors may be generated and/or a neutral speech profile may be defined for the speaker, as discussed herein.

Figure 6:
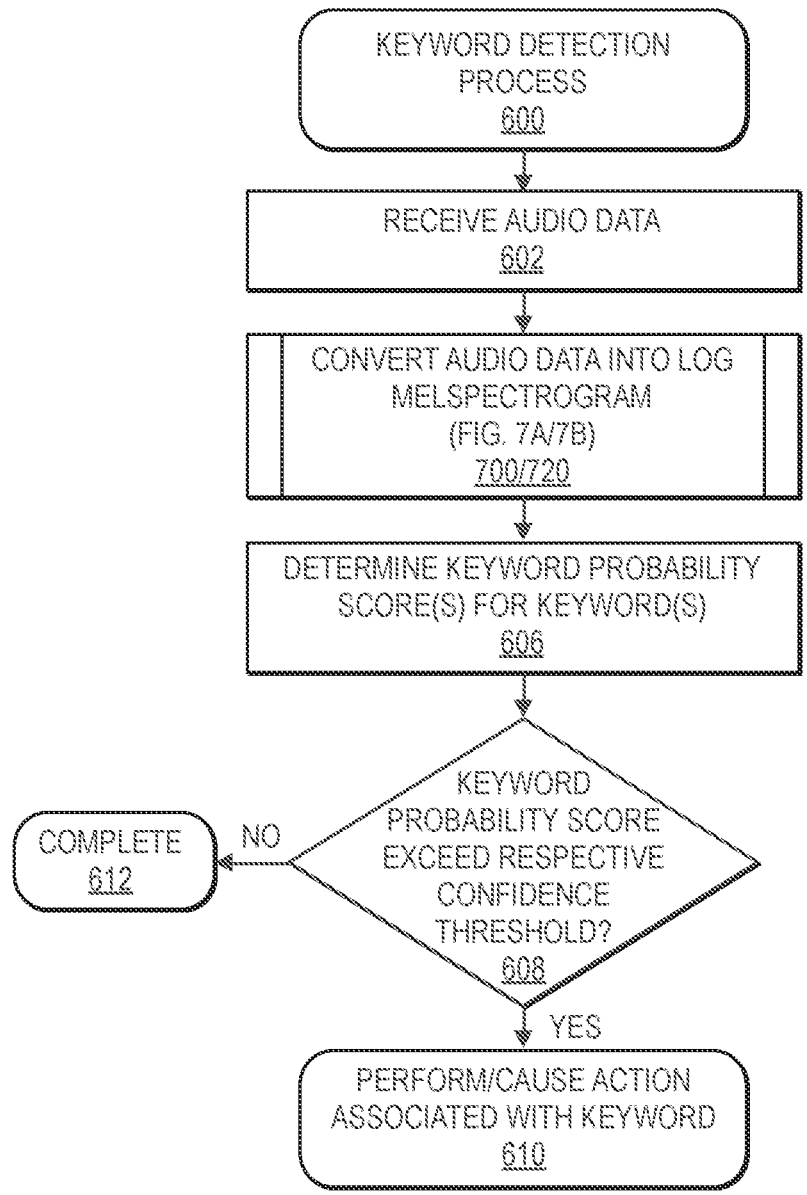
FIG. 6 is an example keyword detection process, in accordance with described implementations.

FIG. 6 is an example keyword detection process 600, in accordance with described implementations. While the other examples discussed herein have been discussed primarily with respect to authenticating a speaker as intending to enroll in a voice service, the example process 600 may be used to detect any of one or more keywords using the implementations discussed herein and is not limited to authentication of speech during an enrollment into a voice service. For example, the example process 600 may be used to detect certain keywords, such as requests or calls for help, uttered by a speaker. In one example, as part of an enrollment in a voice service, a speaker may indicate that utterances by the speaker are to be processed using the disclosed implementations to monitor for one or more keywords. In such an example, if the keyword is detected, the user may specify one or more actions that are to be performed in response to such detection (e.g., initiate a call for help, or a call to the police, fire, hospital, etc.). For example, one or more keywords for which a machine learning model has been trained may be selected by a speaker for continuous monitoring and the speaker may further specify one or more actions that are associated with the keyword and executed upon detection of the keyword.

Returning to FIG. 6, the example process 600 begins upon receipt of audio data, as in 602. Because the example process 600 may be continually performed, the audio data may be periodically generated and provided to the example process 600. Alternatively, audio data may be generated in response to a detected change in the audio within an environment. Other examples may also be contemplated that result in audio data being provided to the example process 600. For example, a user input, such as a selection of a control button on a device, may cause audio data to be generated and provided to the example process 600.

Upon receipt of audio data, the audio data is converted into a log melspectrogram, as in 700/720. Conversion of audio data into a log melspectrogram is discussed further below with respect to FIGS. 7A and 7B.

The log melspectrogram is then processed to determine one or more keyword probability scores, as in 606. For example, audio data may be processed using a machine learning model trained to produce keyword probability scores for one or more keywords in response to an input of a log melspectrogram. In examples in which the audio data is segmented into a plurality of defined length audio data segments and log melspectrograms generated for each defined length audio data segment (FIG. 7B), each of those log melspectrograms may be processed and the outputs, such as the one or more keyword 4847-5401-2383, v. 1 probabilities scores, considered together as representative of the probabilities as to whether a keyword is included in the audio data.

A determination is then made as to whether a resulting keyword probability score exceeds a confidence threshold corresponding to that keyword, as in 608. As discussed above, one or more confidence scores may exist against which keyword probability scores are compared to determine if the respective keyword is represented by the log melspectrogram. For example, each keyword may have a corresponding confidence threshold.

If it is determined that a keyword probability score does not exceed the confidence threshold, the example process 600 completes, as in 612. However, if it is determined that a keyword probability score exceeds a confidence threshold, one or more actions associated with the detected keyword are performed or caused to be performed by the example process 600, as in 610. As indicated above, the action may be any action specified by a user or otherwise associated with a keyword. For example, if the keyword is "call the police," the corresponding action may be initiation of a call to the police. As will be appreciated there need not be a logical correlation between the keyword and the action. For example, the keyword could be "Saskatchewan" and the action that is to be performed in response to detection of such a keyword could be sending of instructions to turn on the exterior lights around a house.

Accordingly, any action can be associated with any keyword. The only limitation is that the trained machine learning model must be trained on log melspectrograms representative of the keyword so that the keyword can be detected using the disclosed implementations. As such, in some implementations, a user may be allowed to select from a defined set of keywords for which the machine learning model is trained and associate any of a variety of actions with those keywords. In other implementations, a user may select or specify any keyword and provide audio data samples of the keyword. The provided audio data samples of the keywords may then be converted into log melspectrograms and used as training inputs to train and/or update training of a machine learning model.

Figure 7A:
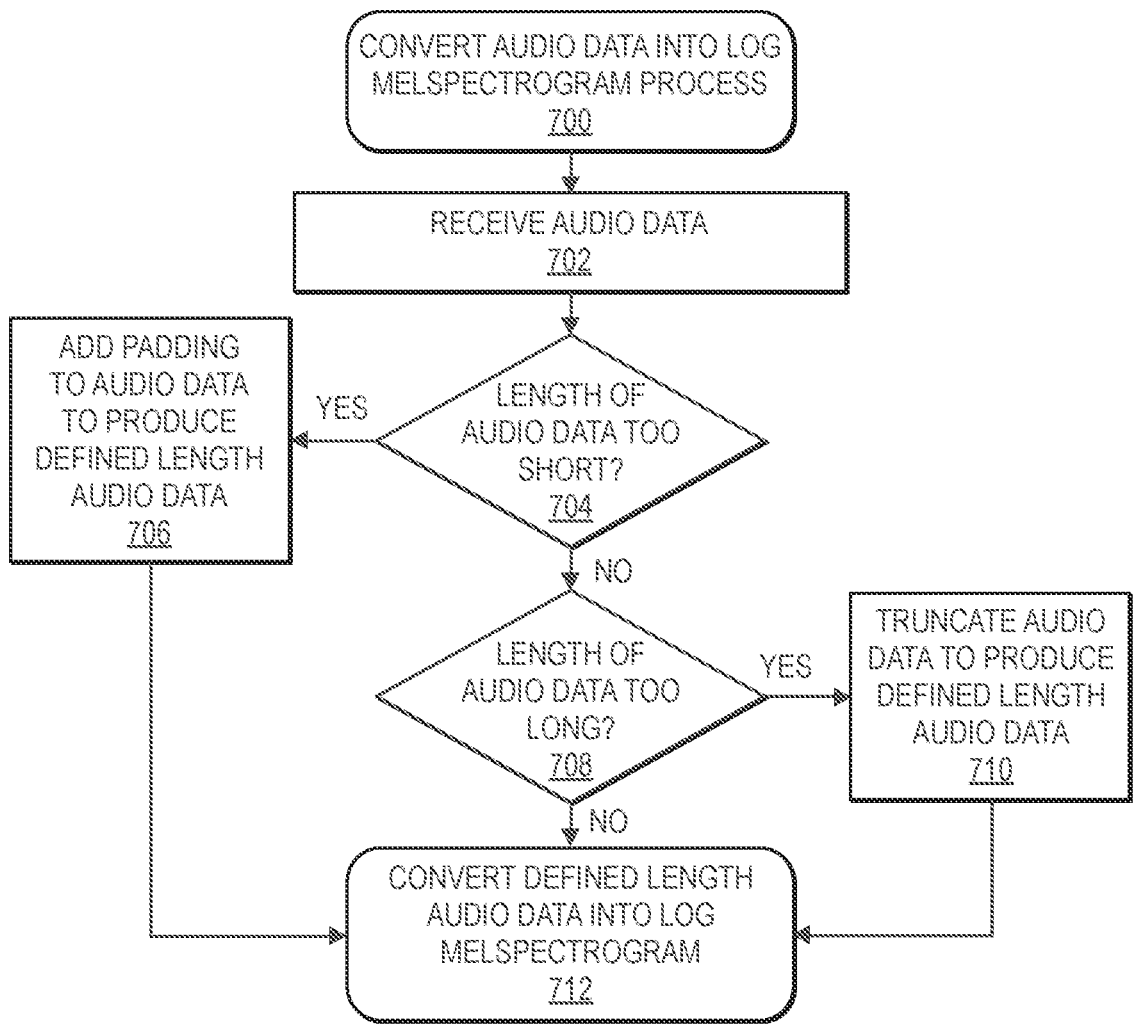
FIG. 7A is an example convert audio into a log melspectrogram process, in accordance with described implementations.

FIG. 7A is an example convert audio data into a log melspectrogram process 700, in accordance with described implementations.

The example process 700 beings upon receipt of audio data that is to be converted into a log melspectrogram, as in 702.

Because machine learning models are generally trained to process inputs of a certain size/type, the example process may first determine if a length of the received audio data is too short, as in 704. For example, a machine learning model may be trained on log melspectrograms generated from audio data samples of a defined lengths (e.g., thirty seconds). Accordingly, each input log melspectrogram will be of a same input size.

If it is determined that the length of the audio data is too short, a padding is added to the beginning and/or end of the audio data to produce a defined length audio data, as in 706. The padding may be blank or null data, random noise, white noise, etc.

If it is determined at decision block 704 that the length of the audio data is not too short, a determination is made as to whether the length of the audio data is too long, as in 708. If it is determined that the audio data is too long, the audio data is truncated to produce a defined length audio data, as in 710. Truncation of audio data may include truncating the beginning and/or end of the audio data. In some implementations, the example process may determine whether the keyword is anticipated to be near the beginning or near the end of the audio data and truncate other portions of the audio data to decrease any chance that the audio data that includes the keyword is truncated. For example, if the keyword of a presented phrase is toward the end of the phrase, it may be determined that the speech that includes the keyword will likely be toward the end of the audio data. Accordingly, if the audio data needs to be truncated to produce a defined length audio data, the beginning of the audio data may be truncated.

After adding padding to the received audio data to produce defined length audio data, as in block 706, after truncating the audio data to produce defined length audio data, as in 710, or if it is determined at decision block 708 that the length of the received audio data is not too long, the defined length audio data is converted into a log melspectrogram, as in 712. Conversion of audio data into a log melspectrogram is known and need not be discussed in detail herein.

Figure 7B:
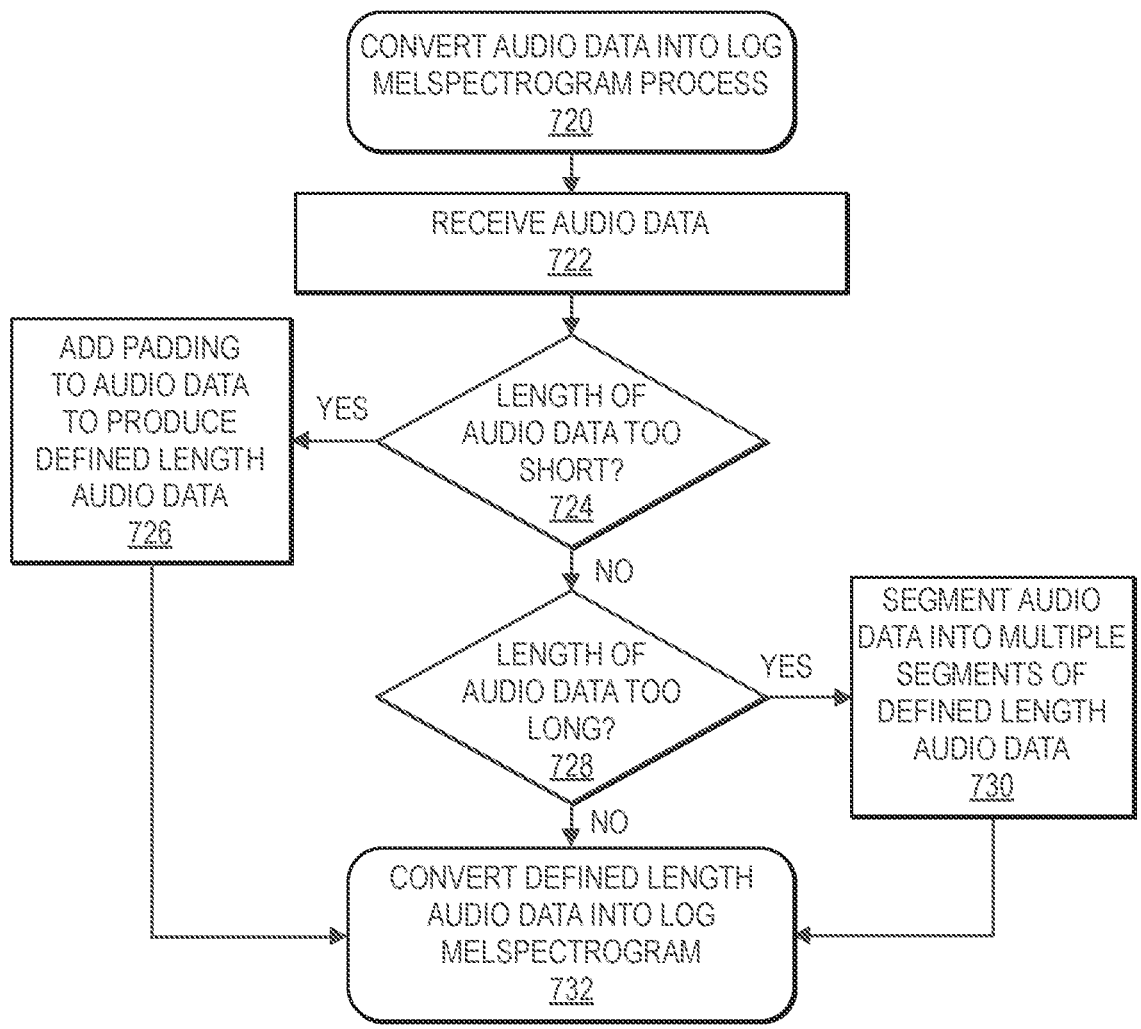
FIG. 7B is another example convert audio into a log melspectrogram process, in accordance with described implementations.

FIG. 7B is another example convert audio data into a log melspectrogram process 720, in accordance with described implementations.

The example process 720 beings upon receipt of audio data that is to be converted into a log melspectrogram, as in 722.

Because machine learning models are generally trained to process inputs of a certain size/type, the example process may first determine if a length of the received audio data is too short, as in 724. For example, a machine learning model may be trained on log melspectrograms generated from audio data samples of a defined lengths (e.g., thirty seconds). Accordingly, each input log melspectrogram will be of a same input size.

If it is determined that the length of the audio data is too short, a padding is added to the beginning and/or end of the audio data to produce a defined length audio data, as in 726. The padding may be blank or null data, random noise, white noise, etc.

If it is determined at decision block 724 that the length of the audio data is not too short, a determination is made as to whether the length of the audio data is too long, as in 728. If it is determined that the audio data is too long, the audio data is segmented into a plurality of defined length audio data segments, as in 730. In some implementations, one or more of the defined length audio data segments may be padded, as discussed above, so that each of the plurality of audio data segments are of the defined length.

After adding padding to the received audio data to produce defined length audio data, as in block 726, after segmenting the audio data into multiple segments of defined length audio data, as in 730, or if it is determined at decision block 728 that the length of the received audio data is not too long, the defined length audio data, or each of the multiple segments of defined length audio data, is converted into a log melspectrogram(s), as in 732. Conversion of audio data into a log melspectrogram is known and need not be discussed in detail herein.

Figure 8:
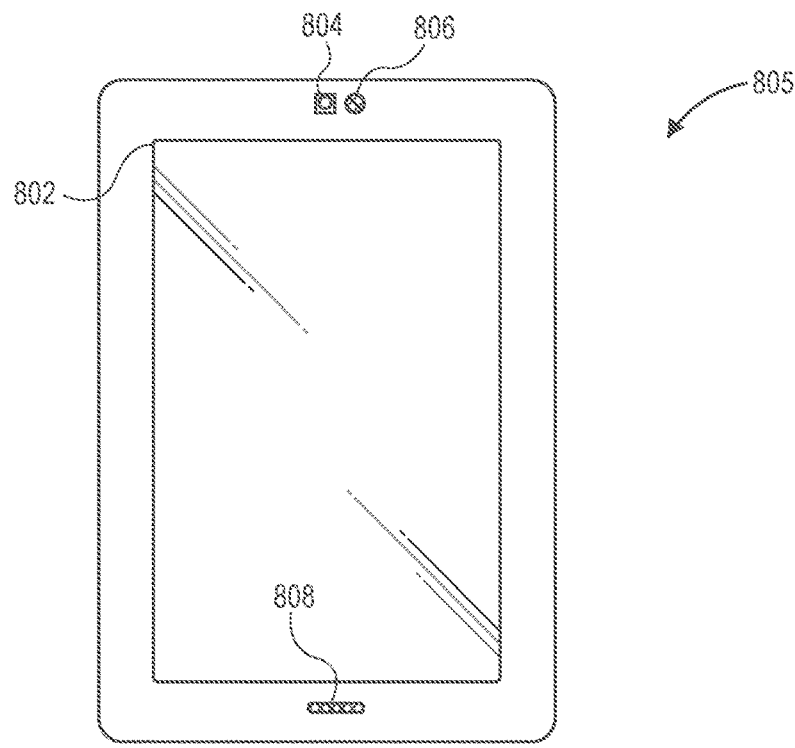
FIG. 8 illustrates an example portable device that can be used in accordance with various implementations.

FIG. 8 illustrates an example portable device 805 that can be used in accordance with various implementations described herein. In this example, the portable device 805 includes a display 802 and optionally at least one input component 804, such as a camera, on a same side of the device as the display 802. The portable device 805 may also include an audio transducer, such as a speaker 806, and a microphone 808. Generally, the portable device 805 may have any form of input/output components that allow a user to interact with the portable device 805. For example, the various input components for enabling user interaction with the device may include a touch-based display 802 (e.g., resistive, capacitive, Interpolating Force-Sensitive Resistance (IFSR)), camera (for gesture tracking, etc.), microphone, global positioning system (GPS), compass or any combination thereof. Various other input components and combinations of input components can be used as well within the scope of the various implementations as should be apparent in light of the teachings and suggestions contained herein.

Figure 9:
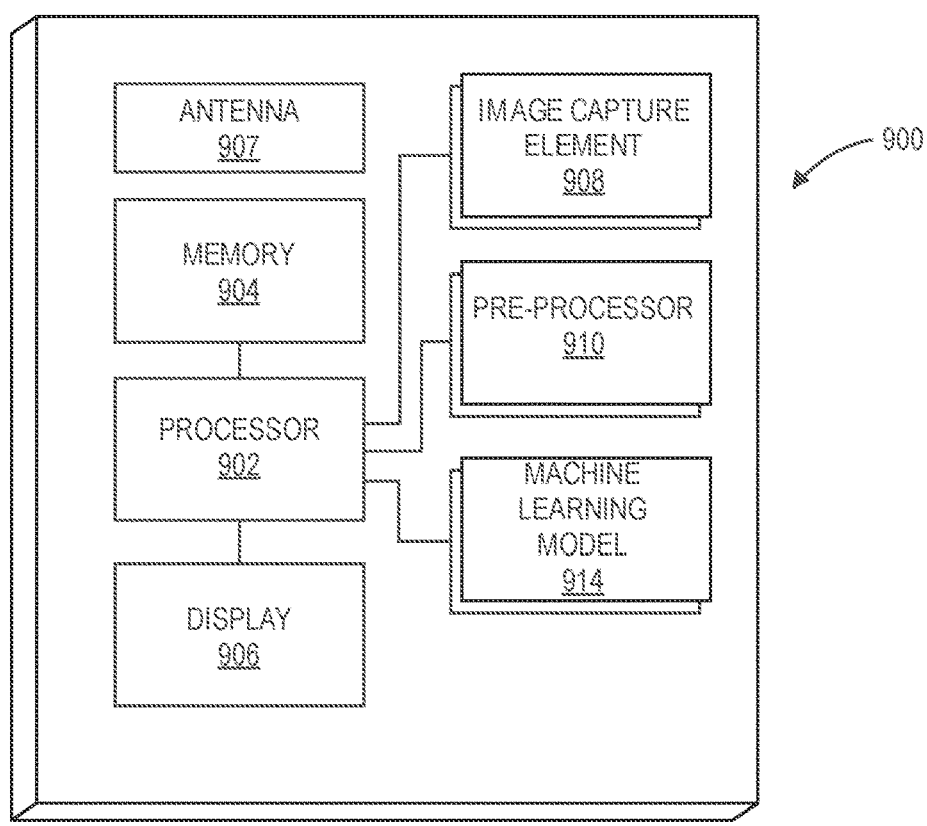
FIG. 9 illustrates an example configuration of components of a portable device, such as that illustrated in FIG. 8.

In order to provide the various functionality described herein, FIG. 9 illustrates an example set of basic components 900 of a portable device 805, such as the portable device 805 described with respect to FIG. 8 and discussed herein. In this example, the device includes at least one central processor 902 for executing instructions that can be stored in at least one memory device or element 904. As would be apparent to one of ordinary skill in the art, the device can include many types of memory, data storage or computer-readable storage media, such as a first data storage for program instructions for execution by the processor 902. Removable storage memory can be available for sharing information with other devices, etc. The device typically will include some type of display 906, such as a touch-based display, organic light emitting diode (OLED) or liquid crystal display (LCD).

The device in many implementations will include at least one image capture element 908, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one pre-processor 910 that is operable to convert audio data into a log melspectrogram that is provided to a machine learning model 914 executing on the device 900, as discussed herein.

As discussed above, the machine learning model 914 may be trained to generate one or more keyword probability scores indicative of probabilities that the respective keyword is represented by an input log melspectrogram.

The portable device may also include one or more antennas 907 that enable wireless communication between the portable device and the wearable device, as discussed herein. Any form of wireless communication may be used to enable communication between the portable device and the wearable device, including, but not limited to, Wi-Fi, Bluetooth, NFC, etc. In addition, the one or more antennas 907 may also provide wireless communication between the portable device and one or more other devices that are remote from the portable device and the wearable device.

The example portable device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, etc., should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein. Moreover, with respect to the one or more methods or processes of the present disclosure described herein, including but not limited to the flow charts shown in FIGS. 4 through 7B, orders in which such methods or processes are presented are not intended to be construed as any limitation on the claimed inventions, and any number of the method or process steps or boxes described herein can be combined in any order and/or in parallel to implement the methods or processes described herein, and/or omitted. Also, the drawings herein are not drawn to scale.

Aspects of the disclosed apparatus, method, and system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
presenting, on a display of a portable device, a first phrase to be spoken as part of an enrollment process;
as the first phrase is presented on the portable device, recording, at the portable device, a first audio data collected by the portable device;
converting, at the portable device, at least a portion of the first audio data recorded by the portable device into a first log melspectrogram;
processing, at the portable device and with a machine learning model trained with log melspectrograms representative of a plurality of keywords, the first log melspectrogram to determine that at least a portion of the first log melspectrogram represents a first keyword of the plurality of keywords;
presenting, on the display of the portable device, a second phrase to be spoken as part of the enrollment process;
as the second phrase is presented on the portable device, recording, at the portable device, a second audio data collected by the portable device;
converting, at the portable device, at least a portion of the second audio data recorded by the portable device into a second log melspectrogram;
processing, at the portable device and with the machine learning model, the second log melspectrogram to determine that at least a portion of the second log melspectrogram represents a second keyword of the plurality of keywords;
in response to determining that the at least a portion of the first log melspectrogram represents the first keyword and determining that the at least a portion of the second log melspectrogram represents the second keyword, confirming that the first audio data and the second audio data correspond to phrases intentionally spoken as part of the enrollment process; and
in response to confirming that the first audio data and the second audio data correspond to phrases intentionally spoken:
sending, to a second device that is separate from the portable device, a request for a third audio data generated by the second device; and
generating an embedding vector representative of a speech, based at least in part on:
at least a first portion of the first audio data recorded by the portable device;
at least a second portion of the second audio data recorded by the portable device; and
at least a third portion of the third audio data received from the second device.

2. The computer-implemented method of claim 1, wherein processing the first log melspectrogram further includes:
generating, as output from the machine learning model, at least:
a first probability score indicative of a first probability that the at least a portion of the first log melspectrogram is representative of the first keyword; and
a second probability score indicative of a second probability that the at least a portion of the first log melspectrogram is representative of the second keyword.

3. The computer-implemented method of claim 2, wherein:
a first confidence threshold is associated with the first keyword;
a second confidence threshold that is different than the first confidence threshold is associated with the second keyword; and
processing the first log melspectrogram further includes determining that the first probability score exceeds the first confidence threshold corresponding to the first keyword.

4. The computer-implemented method of claim 1, further comprising:
determining that an order of detection of the first keyword and the second keyword corresponds to an order of presentation of the first phrase and the second phrase.

5. The computer-implemented method of claim 1, wherein the neutral emotional speech profile indicates one or more of a pitch of a voice represented in at least the third audio data, a tone of the voice represented in at least the third audio data, or a cadence of the voice represented in at least the third audio data.

6. The computer-implemented method of claim 1, further comprising:
obtaining from a second device that is different than the portable device, the third audio data.

7. A computing system, comprising:
one or more processors; and
a memory storing program instructions that, when executed by the one or more processors, cause the one or more processors to at least:
receive a plurality of audio data segments representative of a speech;
for each of the plurality of audio data segments:
convert the audio data segment into a log melspectrogram;
process the log melspectrogram to determine that a keyword of a plurality of keywords is represented by at least a portion of the log melspectrogram; and
determine a keyword count indicative of a number of keywords determined to be represented in the plurality of audio data segments;
determine if the keyword count exceeds an authentication threshold; and
in response to a determination that the keyword count exceeds the authentication threshold:
send, to a device that is separate from the computing system, a request for a second plurality of audio data segments generated by the device; and
generate an embedding vector representative of at least a portion of the speech, based at least in part on:
at least a first portion of the audio data received at the computing system; and
at least a second portion of the second plurality of audio data segments generated by the device.

8. The computing system of claim 7, wherein the program instructions that, when executed by the one or more processors, further cause the one or more processors to at least:
in response to a determination that the keyword count does not exceed the authentication threshold:

determine that the speech is not intended as part of an enrollment in a service; and
cause the plurality of audio data segments to be discarded by the computing system.

9. The computing system of claim 8, wherein the program instructions that, when executed by the one or more processors, further cause the one or more processors to at least:
in response to the determination that the keyword count does not exceed the authentication threshold, cause a second plurality of audio data segments generated by a device that is separate from the computing system to be discarded.

10. The computing system of claim 7, wherein the program instructions that, when executed by the one or more processors to process the log melspectrogram, further include instructions that, when executed by the one or more processors, further cause the one or more processors to at least:
process the log melspectrogram using a machine learning model to determine, for each of the plurality of keywords, a probability score indicative of a probability that the keyword is represented by at least a portion of the log melspectrogram.

11. The computing system of claim 7, wherein the program instructions that, when executed by the one or more processors to process the log melspectrogram, further include instructions that, when executed by the one or more processors, further cause the one or more processors to at least:
process the log melspectrogram to determine, for each of a plurality of keywords, a probability score indicative of a probability that the keyword is represented by at least a portion of the log melspectrogram; and
determine if a probability score determined for a keyword of the plurality of keywords exceeds a confidence threshold corresponding to the keyword.

12. The computing system of claim 7, wherein the program instructions that, when executed by the one or more processors, further cause the one or more processors to at least:
determine a detection order of the keywords that are determined to be represented by at least a portion of a log melspectrogram; and
determine if the detection order corresponds to an expected detection order; and
wherein confirmation that the speech is intended is further in response to a determination that the detection order corresponds to the expected detection order.

13. The computing system of claim 7, wherein the program instructions that, when executed by the one or more processors, further cause the one or more processors to at least, for each of the plurality of audio data segments:
determine that a length of the audio data segment is less than a defined length; and
in response to a determination that the length of the audio data segment is less than the defined length, add a padding to the audio data segment such that the audio data segment is of the defined length.

14. The computing system of claim 7, wherein the program instructions that, when executed by the one or more processors, further cause the one or more processors to at least, for each of the plurality of audio data segments:
determine that a length of the audio data segment is greater than a defined length; and
in response to a determination that the length of the audio data segment is greater than the defined length, truncate a portion of the audio data segment such that the audio data segment is of the defined length.

15. The computing system of claim 14, wherein the program instructions that, when executed by the one or more processors, further cause the one or more processors to at least:
determine a first portion of the audio data segment in which a keyword is anticipated; and
wherein truncation of the audio data segment corresponds to a second portion of the audio data segment that is different than the first portion.

16. The computing system of claim 7, wherein the program instructions that, when executed by the one or more processors, further cause the one or more processors to at least:
subsequent to causing the embedding vector to be generated, receive an indication of a first keyword that if detected as spoken is to cause an action to be performed;
subsequent to receiving the indication of the first keyword, receive a first audio data segment;
convert the first audio data segment into a first log melspectrogram;
process the first log melspectrogram to determine a first probability score indicative of a first probability that the first audio data segment includes the first keyword;
determine that the first probability score exceeds a first confidence threshold corresponding to the first keyword; and
in response to a determination that the first probability score exceeds the first confidence threshold, cause the action to be performed.

17. An apparatus, comprising:
a microphone;
one or more processors communicatively coupled to the microphone; and
a memory storing program instructions that, when executed by the one or more processors, cause the one or more processors to at least:
receive, from the microphone and as part of an enrollment process, a first audio data segment;
convert the first audio data segment into a first log melspectrogram;
process the first log melspectrogram to determine that at least a portion of the first log melspectrogram represents a first keyword;
receive, from the microphone and as part of the enrollment process, a second audio data segment;
convert the second audio data segment into a second log melspectrogram;
process the second log melspectrogram to determine that at least a portion of the second log melspectrogram represents a second keyword; and
in response to a determination that the at least a portion of the first log melspectrogram represents the first keyword and a determination that the at least a portion of the second log melspectrogram represents the second keyword, authenticate the first audio data segment and the second audio data segment as intentionally spoken as part of the enrollment process;
in response to authentication that the first audio data segment and the second audio data segment correspond to phrases intentionally spoken:
cause a recording of the phrases intentionally spoken to be transmitted from a second device to the apparatus; and generate an embedding vector based at least in part on the phrases, the first audio data segment, and the second audio data segment.

18. The apparatus of claim 17, wherein the program instructions that, when executed by the one or more processors, further cause the one or more processors to at least:
  in response to a determination that at least a portion of the first log melspectrogram represents the first keyword, increase a keyword count;
  in response to a determination that at least a portion of the second log melspectrogram represents the second keyword, increase the keyword count;
  receive, from the microphone and as part of the enrollment process, a third audio data segment;
  convert the third audio data segment into a third log melspectrogram;
  process the third log melspectrogram to determine that the third log melspectrogram does not represent a third keyword;
  in response to a determination that the third log melspectrogram does not represent the third keyword, not increase the keyword count; and
  determine that the keyword count exceeds an authentication threshold; and
  wherein the program instruction that, when executed by the one or more processors to authenticate the first audio data segment and the second audio data segment, are further executed in response to a determination that the keyword count exceeds the authentication threshold.

19. The apparatus of claim 17, wherein the program instructions that, when executed by the one or more processors, further cause the one or more processors to at least:
  determine that an order in which the first keyword is determined and the second keyword is determined corresponds to an expected keyword order; and
  wherein the program instructions that, when executed by the one or more processors to authenticate the first audio data segment and the second audio data segment, are further executed in response to a determination that the order in which the first keyword is determined and the second keyword is determined correspond to the expected keyword order.

20. The apparatus of claim 17,
  wherein the program instructions that, when executed by the one or more processors, further cause the one or more processors to at least:
    determine that a length of the second audio data segment is greater than a defined length; and
    in response to a determination that the length of the second audio data segment is greater than the defined length, segment the second audio data segment into a third audio data segment of the defined length and a fourth audio data segment of the defined length; and
  wherein the program instructions that, when executed by the one or more processors to convert the second audio data segment into the second log melspectrogram, further include instructions that, when executed by the one or more processors, further cause the one or more processors to at least:
    convert the third audio data segment into a third log melspectrogram; and
    convert the fourth audio data segment into a fourth log melspectrogram; and
  wherein the program instructions that, when executed by the one or more processors to process the second log melspectrogram, further include instructions that, when executed by the one or more processors, further cause the one or more processors to at least:
    process the third log melspectrogram and the fourth log melspectrogram to determine that at least a portion of the third log melspectrogram or at least a portion of the fourth log melspectrogram represent the second keyword.

\* \* \* \* \*